US006917873B2

(12) United States Patent
Itoyama

(10) Patent No.: US 6,917,873 B2
(45) Date of Patent: Jul. 12, 2005

(54) CONTROL OF MULTIPLE SUPERCHARGED COMPRESSION IGNITION ENGINES HAVING EGR

(75) Inventor: Hiroyuki Itoyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 217 days.

(21) Appl. No.: 10/270,244

(22) Filed: Oct. 15, 2002

(65) Prior Publication Data

US 2003/0088357 A1 May 8, 2003

(30) Foreign Application Priority Data

Oct. 15, 2001 (JP) ....................................... 2001-316291

(51) Int. Cl.$^7$ ................................................. G06F 7/00
(52) U.S. Cl. ....................... 701/108; 701/100; 701/103; 701/110; 701/114; 701/115; 123/564; 123/568.12; 123/568.16; 123/568.21; 123/562; 60/600; 60/602; 60/605.2; 60/612
(58) Field of Search ............................... 701/108, 115, 701/110, 103, 100, 114; 123/568.16, 562, 564, 568.12, 568.21; 60/605.2, 602, 612, 600

(56) References Cited

U.S. PATENT DOCUMENTS

| 5,205,191 | A | * | 4/1993 | Takata et al. ................. 477/33 |
| 5,899,070 | A |   | 5/1999 | Droessler et al. |
| 6,202,415 | B1 | * | 3/2001 | Lohmann et al. .............. 60/612 |
| 6,209,530 | B1 | * | 4/2001 | Faletti et al. .......... 123/568.21 |
| 6,273,076 | B1 | * | 8/2001 | Beck et al. ................. 123/679 |
| 6,327,856 | B1 | * | 12/2001 | Iwabuchi et al. ............. 60/603 |
| 6,360,732 | B1 |   | 3/2002 | Bailey et al. |
| 6,397,598 | B1 |   | 6/2002 | Pierpont |
| 6,412,279 | B1 |   | 7/2002 | Coleman et al. |
| 6,457,461 | B1 | * | 10/2002 | Romzek ..................... 701/108 |
| 6,480,782 | B2 | * | 11/2002 | Brackney et al. ........... 701/108 |
| 6,665,604 | B2 | * | 12/2003 | Arnold ...................... 701/100 |
| 2001/0045201 | A1 |   | 11/2001 | Itoyama |

FOREIGN PATENT DOCUMENTS

| EP | 1 077 320 A2 | 2/2001 |
| JP | 6-129253 A | 5/1994 |
| JP | 2001-329901 A | 11/2001 |
| WO | WO 01/88360 A1 | 11/2001 |

* cited by examiner

Primary Examiner—Tony M. Argenbright
Assistant Examiner—Johnny H. Hoang
(74) Attorney, Agent, or Firm—Foley & Lardner LLP

(57) ABSTRACT

A vehicle system controls a compression ignition internal combustion engine equipped with a supercharger system including a plurality of superchargers. The compression ignition internal combustion engine has an exhaust gas recirculation (EGR) system. The vehicle system determines a desired intake manifold supercharging state (tQac) and a desired EGR rate (Megr). The vehicle system includes control logics, each having a first input parameter and a second input parameter, for determining desired set points (Rvnt1 & Rvnt2) for the plurality of superchargers, respectively. The desired set points are used to control the plurality of superchargers, respectively. The vehicle system also includes control logic for determining the first input parameters in response to the desired intake manifold supercharging state. The vehicle system further includes control logic for determining the second input parameters in response to the desired EGR rate.

52 Claims, 16 Drawing Sheets

CONTROL OF MULTIPLE SUPERCHARGED COMPRESSION IGNITION ENGINES HAVING EGR

BACKGROUND OF THE INVENTION

1. Field of the Invention

The present invention relates generally to supercharged compression ignition engines having an exhaust gas recirculation (EGR) and, more particularly, to a system for and a method of controlling a compression ignition internal combustion engine having an EGR system and a multiple supercharger system including a plurality of superchargers.

2. Description of the Background Art

Many compression ignition engines use turbochargers to improve engine performance. A turbocharger increases the density of the intake air into the engine. The higher density air increases the amount of fuel the engine may combust. As a result, the power output of the engine increases.

Turbochargers typically include a turbine and a compressor connected by a common shaft. The turbine has blades attached to a wheel, which is mounted on the shaft. A turbine housing encloses the turbine and connects to the exhaust manifold of the engine. The turbine housing has vanes for directing the exhaust gases against the turbine blades. The compressor has blades attached to another wheel, which also is mounted on the shaft. A compressor housing encloses the compressor and connects to the intake manifold of the engine. The compressor housing has vanes for assisting the compressor to pressurize intake air. The compressor housing is isolated from the turbine housing.

In operation, exhaust gases pass through the exhaust gas manifold into the turbine housing. The vanes in the turbine housing direct the exhaust gases against the turbine blades. The exhaust gas pressure causes the turbine to spin, which causes the compressor to spin. The spinning compressor pressurizes the intake air. As a result, higher density air is provided to the intake manifold.

In a turbocharger, the exhaust gas pressure has a direct effect on the intake air pressure. As the exhaust gas pressure increases, the turbine and consequently the compressor spin faster. A faster spinning compressor increases the intake air pressure. The opposite effect occurs as the exhaust gas pressure decreases.

Many conventional turbochargers have a fixed geometry. The vanes in the turbine and compressor housings are stationary. By design, a fixed-geometry turbocharger operates efficiently at a particular engine speed and load. Conversely, it operates less efficiently at engine speed and loads for which it is not designed.

At low engine speeds, the exhaust gas pressure is low. It may be below the minimum necessary for operating the turbine. As the engine accelerates from idle or slow speeds, there is a delay from the time when the engine load increases to the time when there is sufficient exhaust gas pressure to spin the turbine. Even when the turbine spins, the exhaust gas pressure may not reach a pressure high enough to spin the turbine as fast as it is necessary for the compressor to produce the desired intake air pressure.

The exhaust gas pressure increases as engine speed increases. At some point, the pressure becomes high enough to overpower the turbocharger. An overpowered turbocharger reduces engine performance.

To improve efficiency, fixed-geometry turbochargers are sized to provide high compressor speeds at low engine speeds. The vanes in the turbine housing are usually narrow to increase the exhaust gas pressure. The vanes also direct the exhaust gas flow toward a portion of the turbine blades. While these changes improve the performance of the turbocharger at low engine speeds, they adversely affect the performance of the turbocharger at high engine speeds. The narrowing of the vanes lowers the exhaust gas pressure at which the turbocharger becomes overdriven.

To avoid overdriving, fixed-geometry turbochargers have a waste gate or similar valve positioned between the turbine and the exhaust gas manifold. When the exhaust gas pressure reaches a certain level, the waste gate opens to divert exhaust gas away from the turbine.

New turbocharger designs have a variable geometry. Turbochargers of such designs are called variable geometry turbochargers (VGT). There are several designs for the variable geometry turbocharger. In one design, a movable sidewall varies the effective cross sectional area of the turbine housing. In another design, the turbine and/or compressor housings have variable nozzles. The nozzles move to change the flow area and flow direction. In many designs, only the turbine has variable nozzles.

A variable nozzle turbine (VNT) turbocharger typically has curvilinear nozzles, which rotate between open and closed positions about a pivot. In some designs, the closed position leaves a small gap between the nozzles. In other designs, the nozzles touch when they are closed, which essentially stops the flow of exhaust gases to the turbine. The nozzles connect to each other by a ring or similar apparatus to move in unison.

When the exhaust gas pressure is low, the nozzles close to create a narrower area for the exhaust gases to flow. The narrow area restricts gas flow through the turbine housing, thus increasing exhaust gas pressure. The nozzles also direct the exhaust gases optimally at the tips of the turbine blades. The directed flow and higher pressure enable the turbine to start spinning sooner and at a faster rate. As a result, a VNT turbocharger provides the high compressor speeds desired at low engine speeds.

As the exhaust gas pressure increases, the nozzles open to reduce the restriction to the gas flow. The gas flow also is directed toward the entire length of the turbine blades. With less restriction and broader gas flow, the turbine and consequently compressor spins slower than if the nozzles were closed under these conditions. As a result, the turbocharger is able to respond and correct for overdriven conditions. An optimal position for the nozzles is determined from a combination of desired torque response, fuel economy, and emission requirements.

Exhaust gas recirculation (EGR) systems are used to reduce NOx emissions by increasing the dilution fraction in the intake manifold. EGR is typically accomplished with an EGR valve that interconnects the exhaust manifold and the intake manifold. In the combustion cylinders, the recirculated exhaust gas acts as an inert gas, thus lowering the flame and in-cylinder gas temperature and, hence, decreasing the formation of NOx.

In compression ignition engines equipped with a VGT system and an EGR system, optimal engine performance in terms of fuel economy and emissions is achieved by coordinating the operation of two actuators.

EP 1 077 320 A2 (published Feb. 21, 2001), which was filed by the assignee to which the present application has been assigned, discloses a conventional VGT control system for a compression ignition internal combustion engine having an EGR system and a single VGT system. The conventional system utilizes a microprocessor-based controller having boost maps stored therein. As shown in FIGS. 70 and 72 of this published EP application, the boost maps contain the desired opening ratio for nozzles of a VGT as a function a combination of a first input parameter and a second input parameter. The first input parameter is an intake air amount equivalence value (tQas0). The second input parameter is an actual EGR rate (Megrd). The controller monitors the engine speed and accelerator pedal opening angle, and has maps stored therein to determine the first input parameter and second input parameter. This conventional system has proven to be satisfactory.

However, a need remains to improve the conventional system such that it is applicable to vehicles having a compression ignition internal combustion engine equipped with an EGR system and a supercharger system including a plurality of superchargers.

Accordingly, an object of the present invention is to provide a system for and a method of controlling a vehicle having a compression ignition internal combustion engine equipped with an EGR system and a supercharger system including a plurality of superchargers.

SUMMARY OF THE INVENTION

In one exemplary implementation of the present invention, there is provided a system for controlling a vehicle having a compression ignition internal combustion engine, the compression ignition internal combustion engine having an intake manifold, an exhaust gas recirculation (EGR) system and a supercharger system including a plurality of superchargers. The system comprises control logic for determining a desired intake manifold supercharging state and control logic for determining a desired EGR rate. The system also comprises control logics, each having a first input parameter and a second input parameter, for determining desired set points for the plurality of superchargers, respectively. The desired set points are used to control the plurality of superchargers, respectively. The system also comprises control logic for determining the first input parameters in response to the desired intake manifold supercharging state. The system further comprises control logic for determining the second input parameters in response to the desired EGR rate.

BRIEF DESCRIPTION OF THE DRAWINGS

The present invention may be better understood from reading of the following description in conjunction with the accompanying drawings.

DETAILED DESCRIPTION OF THE INVENTION

Figure 1:
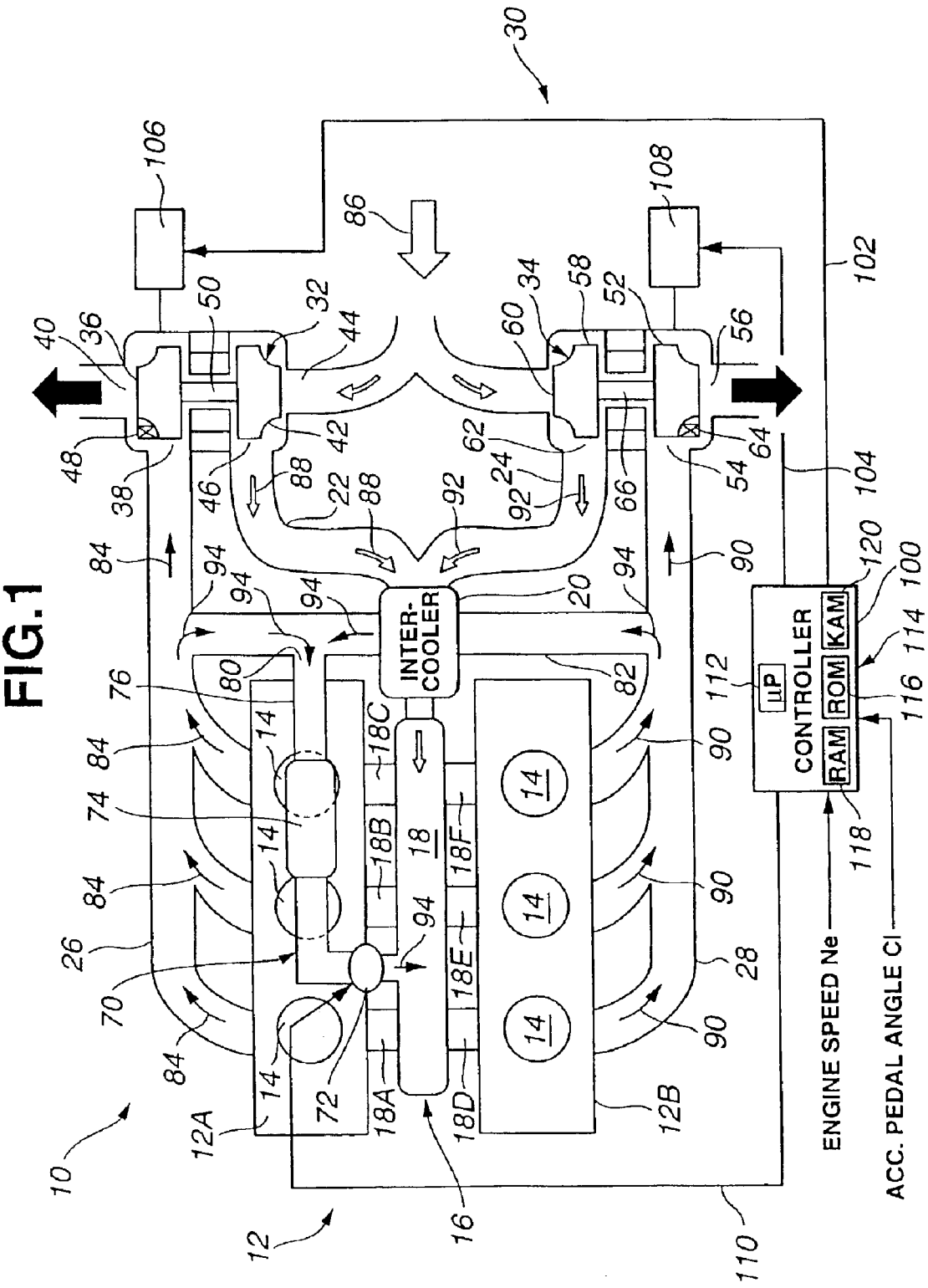
FIG. 1 is a schematic view of a system for controlling a vehicle having a compression ignition internal combustion engine equipped with an EGR system and a multiple supercharger system.

Referring first to FIG. 1, there is shown a schematic view of a system for controlling a vehicle. The system, generally indicated by reference numeral 10, includes an internal combustion engine 12 having a plurality of combustion cylinders 14, each fed by a fuel injector, not shown. In an exemplary embodiment, engine 12 is a compression ignition internal combustion engine, such as a six, eight or twelve-cylinder diesel engine or a diesel engine having any desired number of combustion cylinders. The fuel injectors receive pressurized fuel from a supply connected to one or more high or low pressure pumps (not shown) as is well known in the art. Engine 12 has a V-configuration or an in-line configuration, and in embodiment shown in FIG. 1 has a V-configuration. In FIG. 1, engine 12 has six combustion cylinders 14, three in a first bank 12A of the V-configuration and the remaining three in a second bank 12B thereof.

Each of combustion cylinders 14 is coupled with a corresponding intake manifold 16 and exhaust manifold 18, 20. Engine 12 has one or more intake manifolds, and in embodiment shown in FIG. 1 has a single intake manifold 16. This single intake manifold 16 is fluidly coupled with each combustion cylinder 14 and provides intake air to each combustion cylinder. The intake manifold 16 includes a collector 18 fluidly coupled with each combustion cylinders 14 via branch conduits 18A to 18F leading to combustion cylinders 14, respectively. Intake manifold 16 also includes an intercooler 20 and a plurality of induction conduits 22, 24. The collector 18 is fluidly coupled, via intercooler 20, with each induction conduit 22, 24. Engine 12 also has one or more exhaust manifolds 26, 28, and in the embodiment shown in FIG. 1 has a first exhaust manifold 26 and a second exhaust manifold 28. First exhaust manifold 26 is fluidly coupled with three combustion cylinders 14, and second exhaust manifold 28 is fluidly coupled with the remaining three combustion cylinders 14.

Engine 12 has a multiple supercharger system 30. System 30 includes a plurality of superchargers 32, 34, and in embodiment shown in FIG. 1 includes a first turbocharger 32 and a second turbocharger 34. In embodiment shown in FIG. 1, each turbocharger is a variable nozzle turbine (VNT) turbocharger. The present invention is applicable to any variable geometry turbocharger (VGT), a fixed variable geometry turbocharger with a controllable waste gate and an engine driven supercharger with a controllable element.

In FIG. 1, first turbocharger 32 includes a first turbine 36 having a first turbine inlet 38 and an outlet 40, and a first compressor 42 having a first compressor inlet 44 and an outlet 46. At turbine inlet 38, first turbocharger 32 has controllably actuatable variable nozzles 48, which may be controllably adjusted to any opening position between open and closed positions to thereby provide an inlet orifice to first turbine 36 with a varying area. By varying the opening area of nozzles 48, the flow rate through first turbine 36 is controlled, which in turn controls the rotational output speed of first turbine 36.

First turbine 36 is mechanically coupled with first compressor 42, such as by a shaft 50, and thereby rotatably drives first compressor 42. First turbine inlet 38 is fluidly coupled with first exhaust manifold 26 and receives exhaust gas therefrom for rotatably driving first turbine 36. The exhaust gas that passes through and exits from first turbine 36 flows to the engine exhaust gas system, including any catalytic converter and muffler (not shown), and is eventually discharged to the ambient environment. First compressor inlet 44 receives fresh air from the ambient environment, for compressing within first compressor 42.

Second turbocharger 34 includes a second turbine 52 having a second turbine inlet 54 and an outlet 56, and a second compressor 58 having a second compressor inlet 60 and an outlet 62. Like first turbine inlet 38, at second turbine inlet 54, second turbocharger 34 has controllably actuatable variable nozzles 64, which may be controllably adjusted to any opening position between open and closed positions to thereby provide an inlet orifice to second turbine 52 with a varying area. By varying the opening area of nozzles 64, the flow rate through second turbine 52 is controlled, which in turn controls the rotational output speed of second turbine 52.

Second turbine 52 is mechanically coupled with second compressor 58, such as by a shaft 66, and thereby rotatably drives second compressor 58. Second turbine inlet 54 is fluidly coupled with second exhaust manifold 28 and receives exhaust gas therefrom for rotatably driving second turbine 52. The exhaust gas that passes through and exits from second turbine 52 flows to the engine exhaust gas system, including any catalytic converter and muffler (not shown), and is eventually discharged to the ambient environment. Second compressor inlet 60 receives fresh air from the ambient environment, for compressing within second compressor 58.

First and second compressor outlets 46, 62 are fluidly coupled with induction conduits 22, 24, respectively, which are fluidly coupled with collector 18. Intercooler 20 is disposed in fluid communication with induction conduits 22, 24 for cooling compressed intake air transported from first and second compressors 42, 58.

Engine 12 has an EGR system. EGR system, generally indicated by reference numeral 70, fluidly connects first and second exhaust manifolds 26, 28 with collector 18 of intake manifold 16. In embodiment shown in FIG. 1, a controllably actuatable EGR valve 72 and cooler 74 are positioned in fluid communication with an EGR duct 76. EGR valve 72 controls a flow of exhaust gas recirculated from each of first and exhaust manifolds 26, 28 to intake manifold 16. Cooler 74 acts as a heat exchanger, to cool the exhaust gas recirculated to intake manifold 16.

EGR duct 76 has an inlet 78 and an outlet 80. EGR duct inlet 78 is fluidly coupled with first and second exhaust manifolds 26, 28 via a portion of a conduit 82 and the remaining portion of conduit 82. At one end, conduit 82 is fluidly coupled with first exhaust manifold 26, and at the other end, conduit 82 is fluidly coupled with second exhaust manifold 28. EGR duct inlet 78 may be directly coupled with first exhaust manifold 26. In this case, the one end of conduit 82 is fluidly coupled with EGR duct 76 and EGR duct inlet 78 is fluidly coupled with second exhaust manifold 28 via conduit 82. EGR duct 76. EGR duct 72 may be provided as a Siamese duct with two inlets, which are directly coupled with first exhaust manifold 26 and second exhaust manifold 28, respectively. In this case, conduit 82 is not needed.

Collector 18 receives exhaust gas flow from EGR duct 76 and compressed intake air from induction conduits 22, 24 via intercooler 20 and supplies a mixture thereof to combustion cylinders 14.

In operation, the exhaust gas 84 from first exhaust manifold 26 drives first turbine 36, which drives first compressor 42, which, in turn, compresses ambient air 86 and directs compressed air 88 into collector 18 via induction conduit 22. The exhaust gas 90 from second exhaust manifold 28 drives second turbine 52, which drives second compressor 58, which, in turn, compresses ambient air 86 and directs compressed air 92 into collector 18 via induction conduit 24. When EGR valve 72 opens, a portion of exhaust gas 84 and a portion of exhaust gas 90 are allowed to flow into collector 18 in the direction of arrows 94.

System 10 includes a controller 100. Controller 100 is coupled to and receives input data from engine 12 and vehicular components (not shown), determines desired set points Rvnt1 and Rvnt2 for first and second turbochargers 26, 28. Controller 100 transmits control signals via signal lines 102 and 104 to actuators 106, 108 for controllably actuatable variable nozzles 48, 60, respectively, for controlling and adjusting areas thereof. Controller 100 transmits control signal via a signal line 110 to EGR valve 72 to control the position thereof.

Controller 100 preferably includes a microprocessor 112 in communication with various computer readable storage media 114 via data and control bus (not shown). Computer readable storage media 114 may include any of a number of known devices which function as a read-only memory (ROM) 116, random access memory (RAM) 118, keep alive memory (KAM) 120, and the like. Computer readable storage media 114 may be implemented by any of a number of known physical devices capable of storing information representing instructions executable via a computer such as controller 100. Known devices may include, but are not limited to, PROM, EPROM, EEPROM, flash memory, and the like in addition to magnetic, optical, and combination media capable of temporary or permanent data storage.

Computer readable storage media 114 implement control logic via software, firmware, hardware, microcode, and/or discrete or integrated circuitry to effect control of various systems and subsystems of the vehicle, such as engine 12, turbochargers 32, 34, and the like.

With continuing reference to FIG. 1, a logic controller, such as microprocessor 112, determines a desired intake manifold supercharging state. Microprocessor 112 also determines a desired EGR rate. Microprocessor 112 determines a first desired set point Rvnt1 for first turbocharger 32 and a second desired set point Rvnt2 for second turbocharger 34. The first desired set point Rvnt1 is preferably determined from look-up map indexed by a first input parameter and a second input parameter. The second desired set point Rvnt2 is preferably determined from look-up map indexed by a first input parameter and a second input parameter. Microprocessor 112 determines the first input parameters in response to the desired intake manifold supercharging state. Microprocessor 112 determines the second input parameters in response to the desired EGR rate.

As will be appreciated by one of ordinary skill in the art, the control logic may be implemented or effected in any one or combination of a variety of control logic methodologies. The various functions are preferably effected by a programmed microprocessor, such as controller 100, but may include one or more functions implemented by dedicated electric, electronic, or integrated circuits. As will also be appreciated, the control logic may be implemented using any one of a number of known programming and processing techniques or strategies and is not limited to the order or sequence illustrated here for convenience. For example, interrupt or event driven processing is typically employed in real-time control applications, such as control of a vehicle engine. The present invention is independent of the particular programming language, operating system or processor used to implement the control logic illustrated.

Throughout the specification, the following notations are used in describing measured or calculated or predicted variables.

| | |
|---|---|
| Cl | accelerator pedal opening angle |
| Ne | engine speed |
| Tw | engine coolant temperature |
| Mqdrv | base fuel injection amount |
| Qsol | desired fuel injection amount |
| Megrd | actual EGR rate at an inlet valve of combustion cylinder |
| Megrd$_{n-1}$ | preceding value of Megrd obtained a predetermined time interval ago |
| Kinb | base volumetric efficiency equivalence value |
| Kin | volumetric efficiency equivalence value |

-continued

| | |
|---|---|
| | $Kin = Kinb \times \dfrac{1}{1 + \dfrac{Megrd_{n-1}}{100}}$ |
| Kkin | time constant equivalence value |
| | Kkin = Kin × KVOL# |
| KVOL# | $KVOL\# = \dfrac{VE}{NC \times VM}$ |
| VE | displacement of engine 12 |
| NC | the number of combustion cylinders VM |
| | the capacity of engine induction system |
| Megrb | base desired EGR rate |
| Kegr_tw | coolant temperature correction coefficient |
| Tlamb | desired excess air ratio |
| BLAMB# | 14.7 |
| Tfbya | desired equivalence ratio |
| tQac | desired intake air amount |
| tQas0 | intake air amount equivalence value |
| Megr | desired EGR rate |
| Rvnt1 | first desired set point for first turbocharger 32 |
| Rvnt2 | second desired set point for second turbocharger 34 |

Figure 2A:
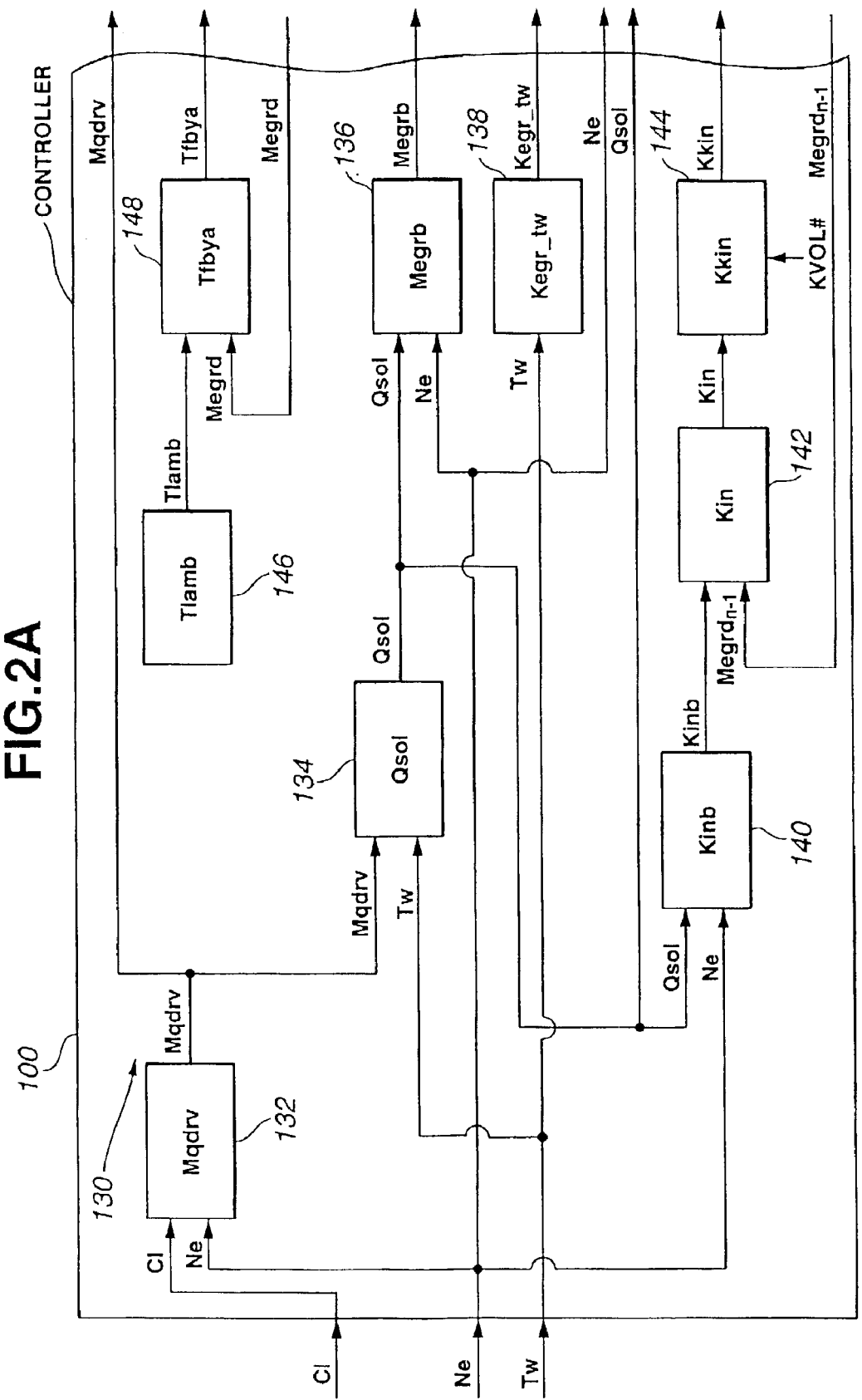
FIGS. 2A and 2B illustrates a block diagram of a control system of the present invention, which controls a multiple supercharger system.
Figure 2B:
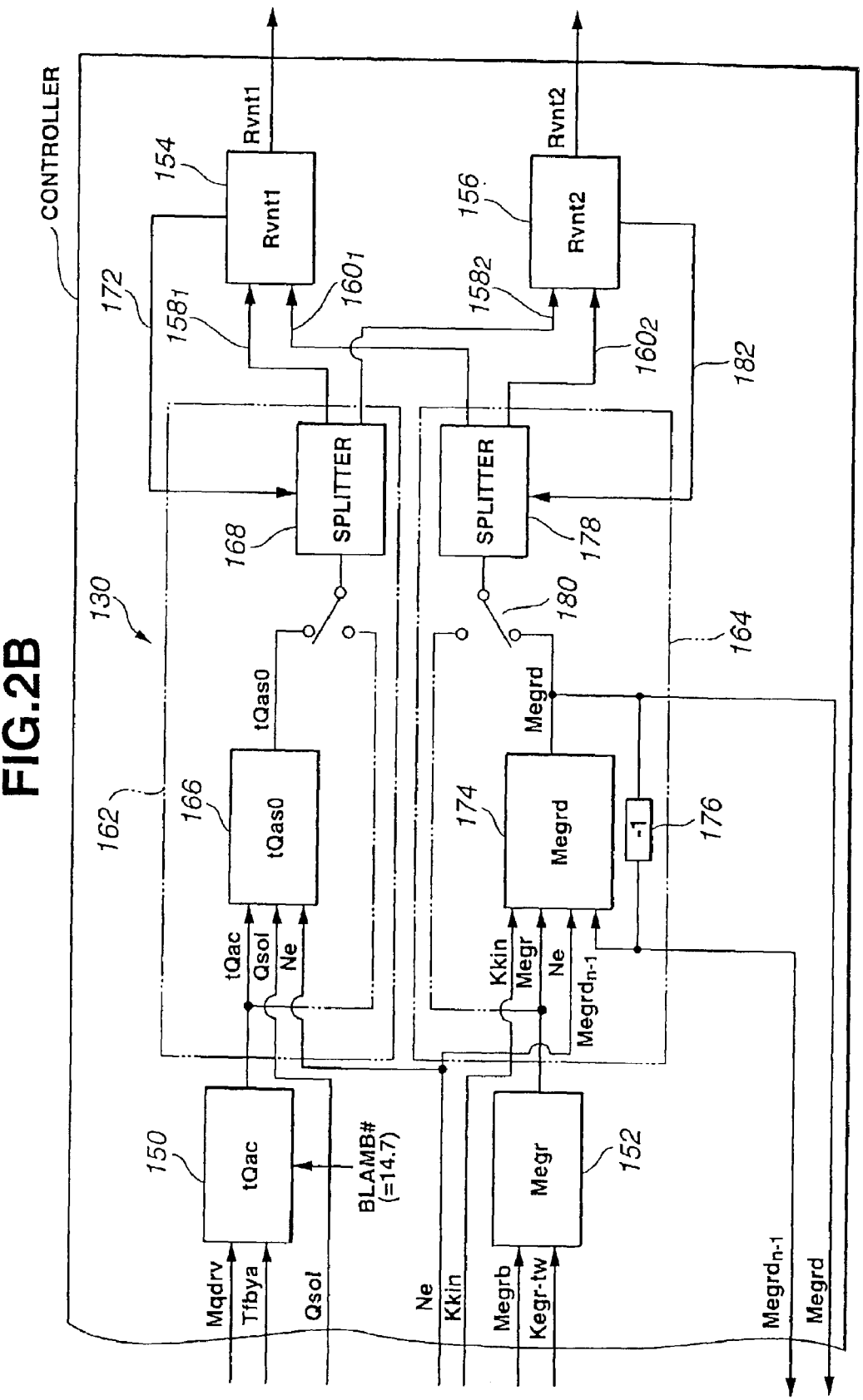

Referring to FIGS. 2A and 2B, a control system 130 for controlling turbochargers 32, 34 is illustrated. Control system 130 is implemented via control logic, an accelerator pedal sensor having an output indicative of accelerator pedal opening angle Cl, an engine speed sensor having an output indicative of engine speed Ne, and a temperature sensor having an output indicative of engine coolant temperature Tw.

Figure 3:
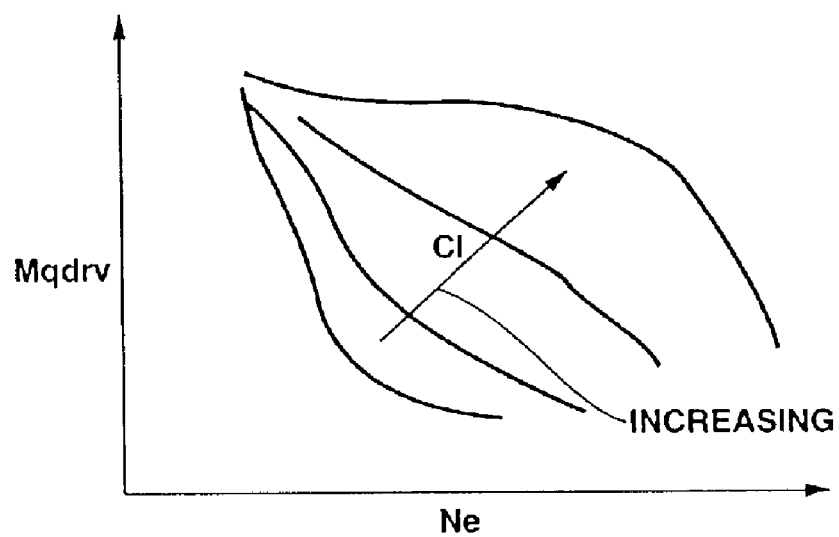
FIG. 3 illustrates a base fuel injection amount (Mqdrv) look-up map indexed by engine speed (Ne) and accelerator pedal opening angle (Cl).
Figure 4:
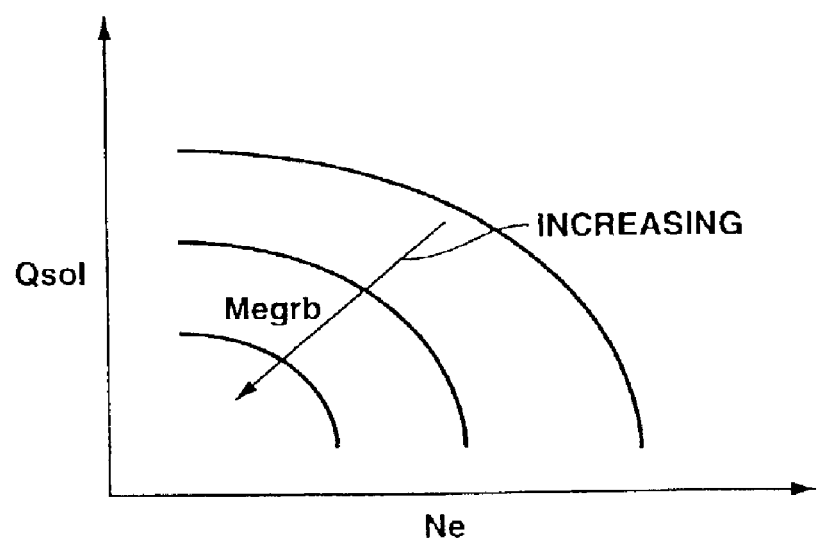
FIG. 4 illustrates a base desired EGR rate (Megrb) look-up map indexed by engine speed (Ne) and desired fuel injection amount (Qsol).
Figure 5:
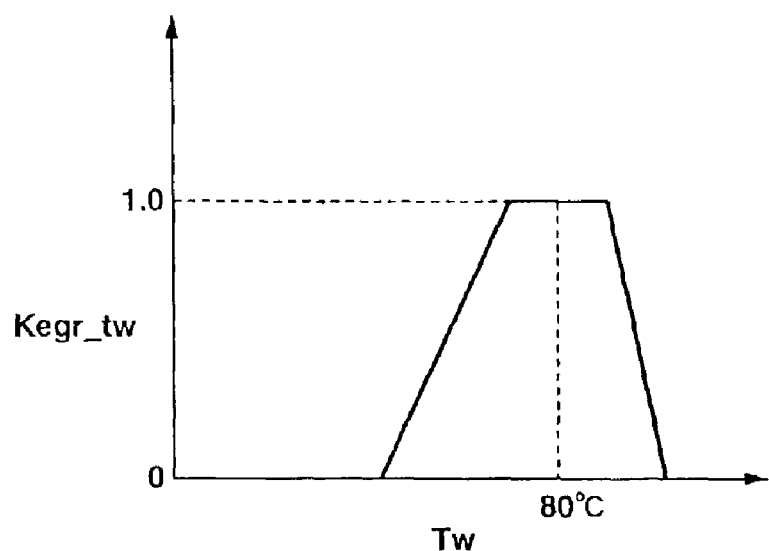
FIG. 5 illustrates a coolant temperature correction coefficient (Kegr_tw) look-up table indexed by engine coolant temperature (Tw).
Figure 6:
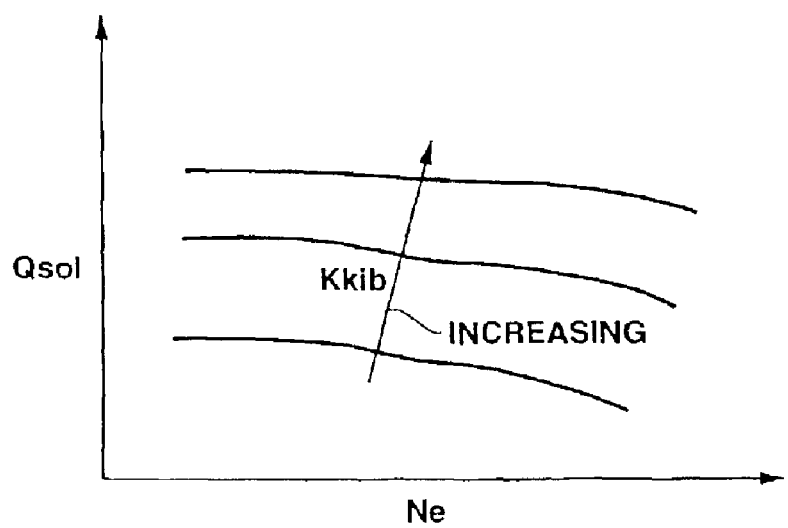
FIG. 6 illustrates a base volumetric efficiency equivalence value (Kinb) look-up map indexed by engine speed (Ne) and desired fuel injection amount (Qsol).

In FIG. 2A, control system 130 includes control logic 132 for determining base fuel injection amount Mqdrv from look-up map indexed by engine speed Ne and accelerator pedal opening angle Cl as shown in FIG. 3. Control system 130 also includes control logic 134 for determining desired fuel injection amount Qsol by correcting base fuel injection with engine coolant temperature Tw. Control system 130 also includes control logic 136 for determining a base desired EGR rate Megrb from look-up map indexed by desired fuel injection amount Qsol and engine speed Ne as shown in FIG. 4. Control system 130 also includes control logic 138 for determining a coolant temperature coefficient Kerg_tw from look-up table indexed by engine coolant temperature Tw as shown in FIG. 5. Control system 130 also includes control logic 140 for determining a base volumetric efficiency equivalence value Kinb from look-up map indexed by desired fuel injection amount Qsol and engine speed Ne as shown in FIG. 6. Control system 130 also includes control logic 142 for determining a volumetric efficiency equivalence value Kin that is expressed as $$Kin = Kinb \times \dfrac{1}{1 + \dfrac{Megrd_{n-1}}{100}} \qquad \text{Eq. 1}$$

Control system 130 also includes control logic 144 for determining a time constant equivalence value Kkin that is expressed as $$Kkin = Kin \times KVOL\# \qquad \text{Eq. 2}$$

Control system 130 also includes block 146 to store a desired excess air ratio Tlamb. Control system 130 also includes control logic 148 for determining a desired equivalence ratio Tfbya that is expressed as $$Tfbya = \frac{Tlamb + Megrd \times (Tlamb - 1)}{Tlamb^2} \quad \text{Eq. 3}$$

Turning to FIG. 2B, control system 130 also includes control logic 150 for determining a desired intake manifold supercharging state by determining a desired intake air amount tQac. The desired intake manifold supercharging state may be determined by determining a boost pressure. In the embodiment, control logic 150 receives base fuel injection amount Mqdrv from control unit 132, desired equivalence ratio Tfbya from control logic 148, and BLAMB. Desired intake air amount tQac is expressed as $$tQac = Mqdrv \times \frac{BLAMB\#}{Tfbya} \quad \text{Eq. 4}$$

Control system 130 also includes control logic 152 for determining desired EGR rate Megr. Control logic 152 receives base desired EGR rate Megrb from control logic 136 and coolant temperature correction coefficient Kegr_tw from control logic 138. Desired EGR rate Megr is determined by correcting Megrb with Kegr_tw.

With continuing reference to FIG. 2B, control system 130 also includes control logic 154 for determining a first desired set point Rvnt1 for turbocharger 32 and control logic 156 for determining a second desired set point Rvnt2 for turbocharger 34. Each of control logics 154 and 156 has or receives a first input parameter $158_1$ or $158_2$ and a second input parameter $160_1$ or $160_2$. Desired set points Rvnt1, Rvnt2 are used to control turbochargers 32 and 34. Desired set point Rvnt1 indicates a ratio of opening position of turbine nozzles 48 to the fully opened position thereof. Desired set point Rvnt2 indicates a ratio of opening position of turbine nozzles 64 to the fully opened position thereof. Desired set point Rvnt1 is determined from look-up map indexed by first input parameter $158_1$ and by second input parameter $160_1$. Desired set point Rvnt2 is determined from look-up map indexed by first input parameter $158_2$ and second input parameter $160_2$.

Control system 130 also includes control logic 162 for determining first input parameters $158_1$, $158_2$ in response to desired intake air amount tQac. Control system 130 also includes control logic 164 for determining second input parameters $160_1$, $160_2$ in response to desired EGR rate Megr.

Control logic 162 includes control logic 166 for determining an intake air amount equivalence value tQas0 as a function of desired intake air amount tQac. Control logic 166 receives desired intake air amount tQas0 from control logic 150, desired fuel injection amount Qsol from control logic 134 and engine speed Ne. Intake air amount equivalence value tQas0 is expressed as $$tQas0 = \frac{(tQac + Qsol \times QFGAN\#) \times Ne}{KCON\#} \quad \text{Eq. 5}$$

where
QFGAN# represents a gain,
KCON# represents a constant.
Intake air amount equivalence value tQas0 calculated at control logic 150 is used as an input to control logic 168 for outputting first input parameters $158_1$, $158_2$. As diagrammatically indicated by a selector 170, desired intake air amount tQac may be used as an input to control logic 168. In this case, control logic 166 for determining tQas0 may be eliminated.

The function of control logic 168 depends on the look-up map, used at control logic 154, which was prepared to limit operation of turbocharger 32 to acceptable operating areas of a generator's capability curve. This dependency, as represented by a feedback line 172, will be described later, Control logic 164 includes control logic 174 for determining an actual EGR rate at an inlet valve of combustion cylinder Megrd. Control logic 174 receives desired EGR rate from control logic 152, time constant equivalence value Kkin from control logic 144, and engine speed Ne. EGR rate at inlet valve of combustion cylinder Megrd is expressed as $$Megrd=Megr \times Kkin \times Ne \times KE2\# + Megrd_{n-1} \times (1-Kkin \times Ne \times KE2\#) \quad \text{Eq.6}$$

where
KE2# represents a constant.
A delay 176 is provided to feed back an output Megrd as a preceding value $Megrd_{n-1}$. EGR rate at inlet valve of combustion cylinder Megrd calculated at control logic 174 is used as an input to control logic 178 for outputting second input parameters $160_1$, $160_2$. As diagrammatically indicated by a selector 180, desired EGR rate may be used as an input to control logic 178. In this case, control logic 174 for determining Megrd may be eliminated.

The function of control logic 178 depends on the look-up map, used at control logic 156, which was prepared to limit operation of turbocharger 34 to acceptable operating areas of a generator's capability curve. This dependency, as represented by a feedback line 182, will be described below.

In the embodiment illustrated in FIG. 1, turbochargers 32, 34 are identical or may be regarded as identical, in specification and performance, each having capability of meeting a portion of, at least half, the demand by all combustion cylinders 14. Unlike a single supercharger system in which a single turbocharger has capability to meet demand by all combustion cylinders, multiple supercharger system 30 requires cooperating operation of turbochargers 32, 34 to meet the demand. To accomplish such cooperating operation, control logic 168 varies the first input parameters $158_1$, $158_2$ with different values of tQas0 while keeping them equal to each other in magnitude, and control logic 178 varies the second input parameters $160_1$, $160_2$ with different values of Megrd while keeping them equal to each other in magnitude.

Figure 7:
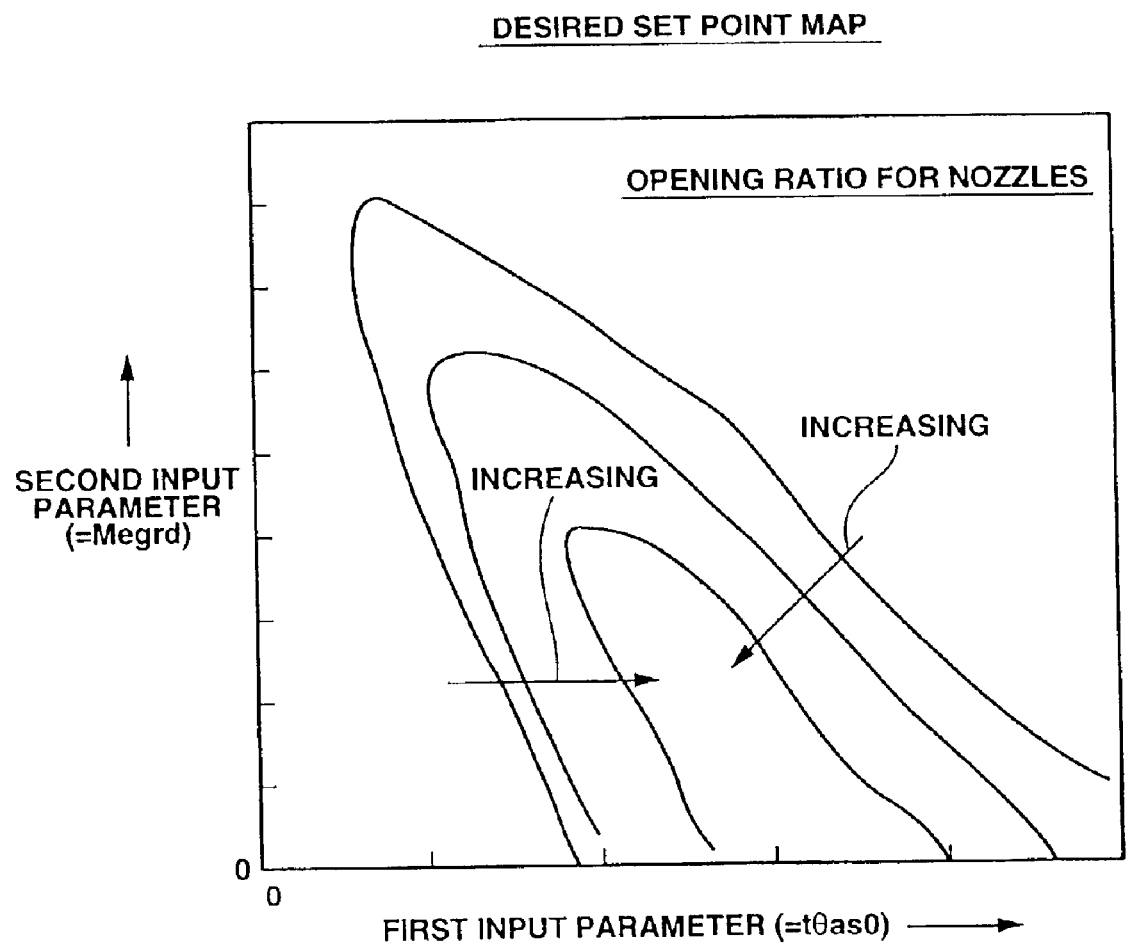
FIG. 7 illustrates a desired set point map.

Using first and second input parameters $158_1$, $160_1$, control logic 154 determines a first desired set point Rvnt1, which is indicative of a desired ratio of nozzle opening to the full opening, from a look-up map shown in FIG. 7. Likewise, Using first and second input parameters $158_1$, $160_1$, control logic 156 determines a second desired set point Rvnt2, which is indicative of a desired ratio of nozzle opening to the full opening, from the look-up map shown in FIG. 7. The data arranged in the map of FIG. 7 are adjusted to a turbocharger capable of supplying compressed air to meet demand by three combustion cylinders.

Figure 8:
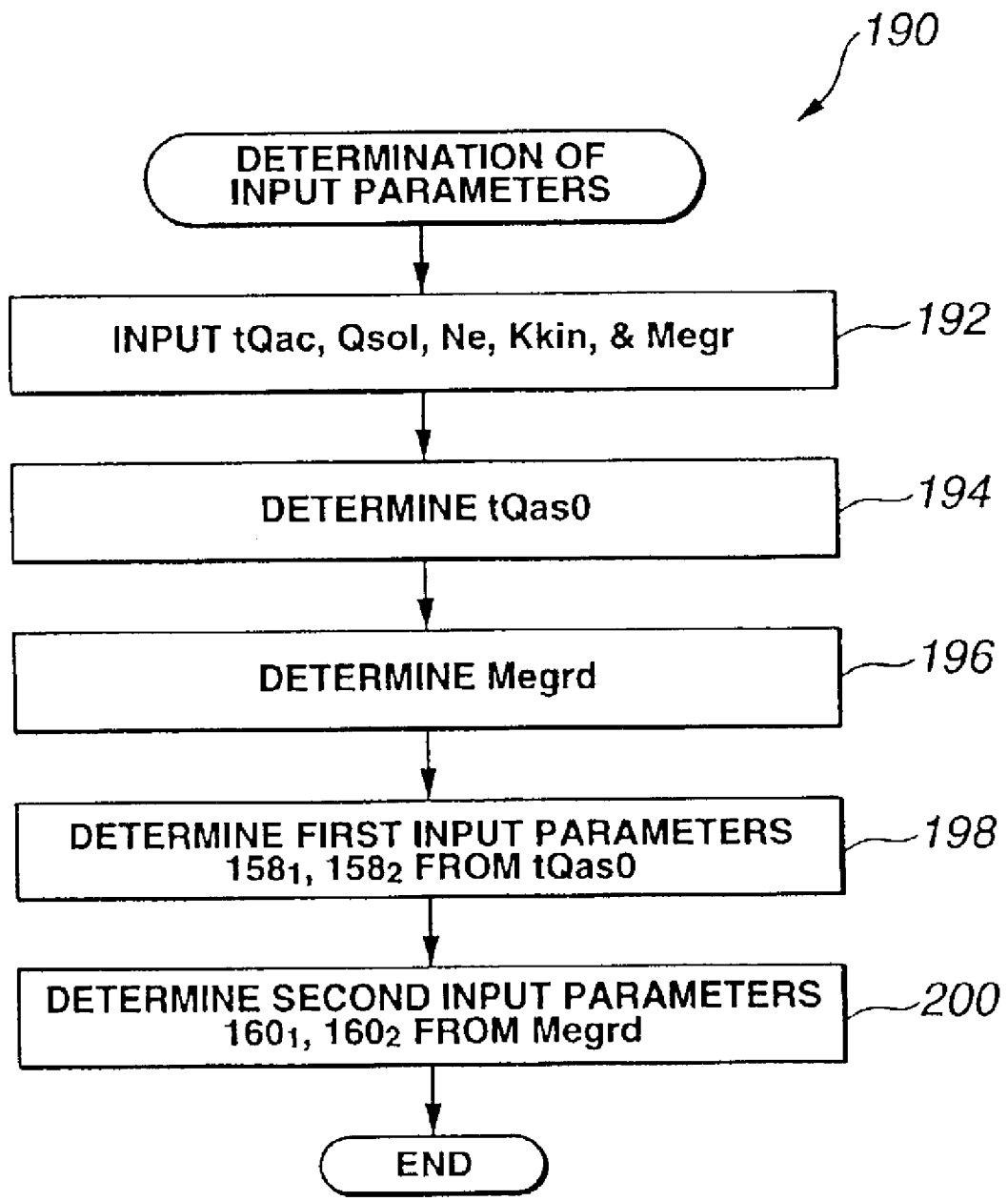
FIG. 8 is a flow diagram of a control routine illustrating control logic for determining first input parameters and control logic for determining second input parameters according to one embodiment of the present invention.

The flow diagram in FIG. 8 illustrates a control routine 190 of an exemplary embodiment of control logic 168 and control logic 178. Execution of control routine 190 is repeated at regular crank angle interval.

In box 192, microprocessor 112 inputs information of: desired intake amount tQac, desired fuel injection amount Qsol, engine speed Ne, time constant equivalence value Kkin, and desired EGR rate Megr.

In box 194, microprocessor 112 determines an intake air amount equivalence value tQas0, which is expressed by the equation 5. In the next box 196, microprocessor 112 determines an EGR rate at inlet valve of combustion cylinder Megrd, which is expressed by the equation 6.

In box 198, microprocessor 112 determines first input parameters $158_1$, $158_2$ from the intake air amount equivalence value tQas0. In the case turbochargers 32, 34 have capability of meeting half the demand by six combustion cylinders 14, the intake air amount equivalence value tQas0 is set as each of first input parameters $158_1$, $158_2$.

In the next box microprocessor 112 determines second input parameters $160_1$, $160_2$ from the EGR rate at inlet valve of combustion cylinder Megrd. In the case turbochargers 32, 34 have capability of meeting half the demand by six combustion cylinders 14, the EGR rate at inlet valve of combustion cylinder Megrd is set as each of second input parameters $160_1$, $160_2$.

With reference to FIG. 2B, in control logic 154, using the first and second input parameters $158_1$, $160_1$, microprocessor 112 determines a desired ratio of nozzle opening as first desired set point Rvnt1 from look-up map shown in FIG. 7. In control logic 156, using the first and second input parameters $158_2$, $160_2$, microprocessor 112 determines a desired ratio of nozzle opening as second desired set point Rvnt1 from look-up map shown in FIG. 7.

A diaphragm exposed to a chamber, whose pressure is controlled by actuator 106, determines opening position of turbine nozzles 48. Likewise, a diaphragm exposed to a chamber, whose pressure is controlled by actuator 108, determines opening position of turbine nozzles 64. Actuator 106 is in the form of a valve that is connected to a suitable fluid source and configured for being driven by a pulse signal whose duty is modulated by a control signal on signal line 102. Actuator 108 is in the form of a valve that is connected to the fluid source and configured for being driven by a pulse signal whose duty is modulated by a control signal on signal line 104.

Controller 100 includes control logic for performing advance processing of first desired set point Rvnt1 to give a control term Avnt_f1. This control term is used in control logic for determining first duty Dtyvnt1 to be applied to actuator 106. Controller 100 also includes control logic for performing advance processing of second desired set point Rvnt2 to give a control term Avnt_f2. This control term is used in control logic for determining second duty Dtyvnt2 to be applied to actuator 108. The advance processing is needed to allow the slower diaphragm aspect of turbine nozzle control to catch up the faster responding set point aspect of turbine nozzle control. For detailed description on the advance processing and control logic for determining duty, reference is made to U.S. Patent Application Publication Pub. No.: US2001/0045210 A1, published Nov. 29, 2001, which has been hereby incorporated by reference in its entirety. In this incorporated publication, paragraphs [0186] to [0198] provide detailed description on advance processing illustrated in FIG. 29, paragraphs [0160] to [0248] provide detailed description on determination of duty illustrated in FIG. 15, and paragraphs [0373] to [0381] provide detailed description on modified duty determination illustrated in FIG. 16.

Figure 9:
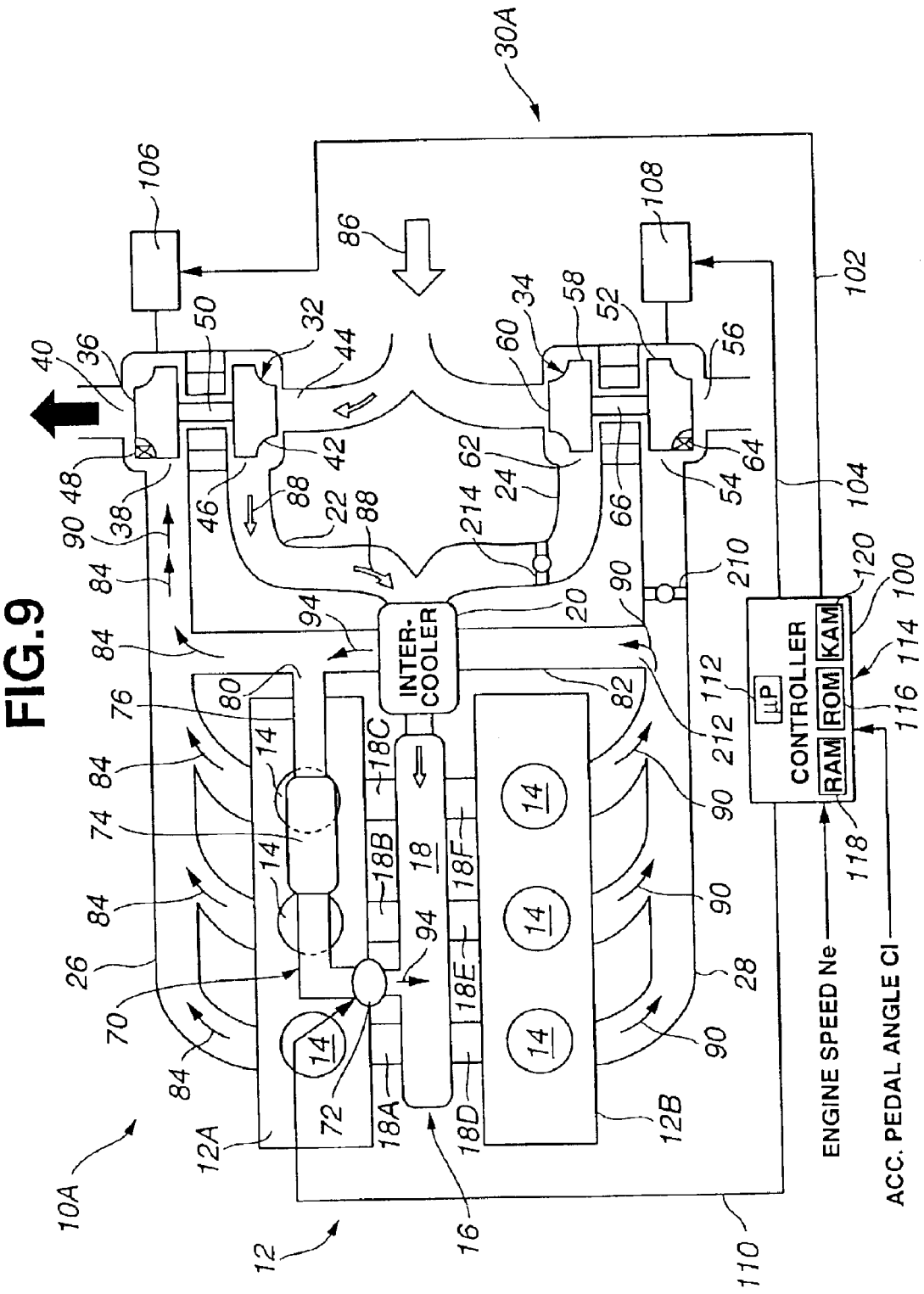
FIG. 9 is a schematic view of another system for controlling a vehicle having a compression ignition internal combustion engine equipped with an EGR system and a multiple supercharger system.

Referring to FIG. 9, there is shown a simplified view of another system for controlling a vehicle. The system, generally indicated by reference numeral 10A, is substantially the same as the previously described system 10. The same reference numerals are used in FIGS. 1 and 9 to indicate the same or similar parts or portions. However, system 10A is different from system 10 in the provision of a multiple supercharger system 30A in the place of multiple supercharger system 30. Unlike multiple supercharger system 30 which allows simultaneous operation of turbochargers 32, 34, multiple supercharger system 30A allows sequential operation of turbochargers 32, 34. Unlike supercharger system 30 in which work is shared evenly to turbochargers 32, 34, supercharger system 30A alters the proportion of shares of work to turbochargers 32, 34 in response to engine operating conditions.

In multiple supercharger system 30A, a first throttle flap 210 is provided to regulate fluid flow between a second exhaust manifold 28 and an inlet 54 of a turbine 52 of turbocharger 34. Throttle flap 210 is positioned between the turbine inlet 54 and an inlet 212 of a conduit 82 interconnecting first and second exhaust manifolds 26 and 28. In system 30A, a second throttle flap 214 is provided to regulate fluid flow through an induction conduit 24. In this example, throttle flap 210 stops the flow of exhaust gas to turbine 52 when it is closed, and throttle flap 214 stops the flow of air through induction conduit 24 when it is closed. FIG. 9 shows how exhaust gas 90 from second exhaust manifold 28 flows when throttle flaps 210, 214 are closed. It is noted that conduit 82 provides a path bridging first and second exhaust manifolds 26, 28. In operation, throttle flaps 210, 214 are closed during engine operation at low speeds. Throttle flaps 210, 214 opens as engine speed increases.

In multiple supercharger system 30A, turbochargers 32, 34 operate sequentially as engine operation shifts. In other words, the supercharger system 30A includes a primary turbocharger 32 and a secondary turbocharger 34 which operate sequentially.

With reference also to FIGS. 2A and 2B, control logic 168 for determining first input parameters $158_1$, $158_2$ includes control logic for determining proportion of each of the first input parameters $158_1$, $158_2$ to the total thereof. The control logic for determining proportion of each to the total of first input parameters $158_1$, $158_2$ includes control logic for determining a distribution ratio Kair.

Figure 10:
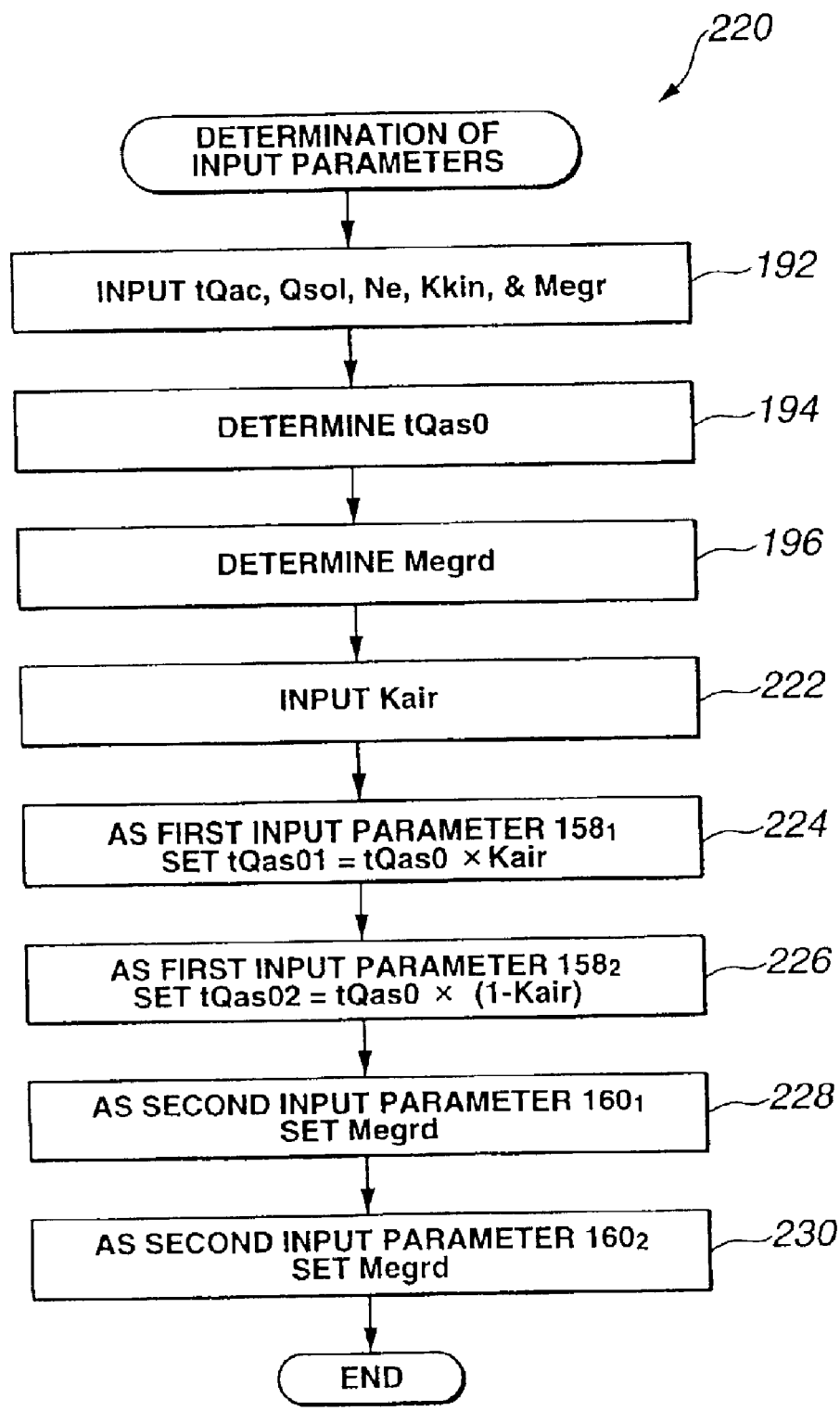
FIG. 10 is a flow diagram of a control routine illustrating control logic for determining first input parameters and control logic for determining second input parameters according to another embodiment of the present invention.

The flow diagram in FIG. 10 illustrates a control routine 220 of an exemplary embodiment of control logic 168 and control logic 178. Execution of control routine 220 is repeated at regular crank angle interval. Control routine 220 is substantially the same as control routine 190 (see FIG. 8) except the provision of boxes 222, 224, 226, 228, and 230 in the place of boxes 198 and 200.

After processing in boxes 192, 194, and 196, the control goes to box 222. In box 222, microprocessor 112 inputs a distribution ratio Kair that is variable from 1 toward 0 (zero). Distribution ratio Kair is determined in response to engine operating conditions. Determination of distribution ratio Kair may be made by executing a sub-routine in box 222. Alternatively, determination of distribution ratio Kair may be made by simply inputting the result of execution of an independent control routine for determining distribution ratio Kair in response to engine operating conditions.

In the next box 224, microprocessor 112 determines the first share tQas01 of intake air amount equivalence value tQas0 using distribution ratio Kair. First share tQas01 is expressed as $$tQas01 = tQas0 \times Kair \qquad \text{Eq. 7}$$

In box 224, microprocessor 112 sets the first share tQas01 as first input parameter $158_1$.

In box 226, microprocessor 112 determines the second or remaining share tQas02 of intake air amount equivalence value tQas0 using a term (1−Kair). Second share tQas02 is expressed as $$tQas02 = tQas0 \times (1 - Kair) \qquad \text{Eq. 8}$$

In box 226, microprocessor 112 sets the second share tQas02 as first input parameter $158_2$.

In the next box 228, microprocessor 112 sets EGR rate at inlet valve of combustion cylinder Megrd as second input parameter $160_1$. In box 230, microprocessor 112 sets EGR rate Megrd as second input parameter $160_2$.

With reference to FIG. 2B, in control logic 154, using the first and second input parameters $158_1$ (=tQas01), $160_1$ (=Megrd), microprocessor 112 determines a desired ratio of nozzle opening as first desired set point Rvnt1 from look-up map prepared for primary turbocharger 32. In control logic 156, using the first and second input parameters $158_2$ (=tQas02), $160_2$ (=Megrd), microprocessor 112 determines a desired ratio of nozzle opening as second desired set point Rvnt2 from look-up map prepared for secondary turbocharger 34.

Figure 11:
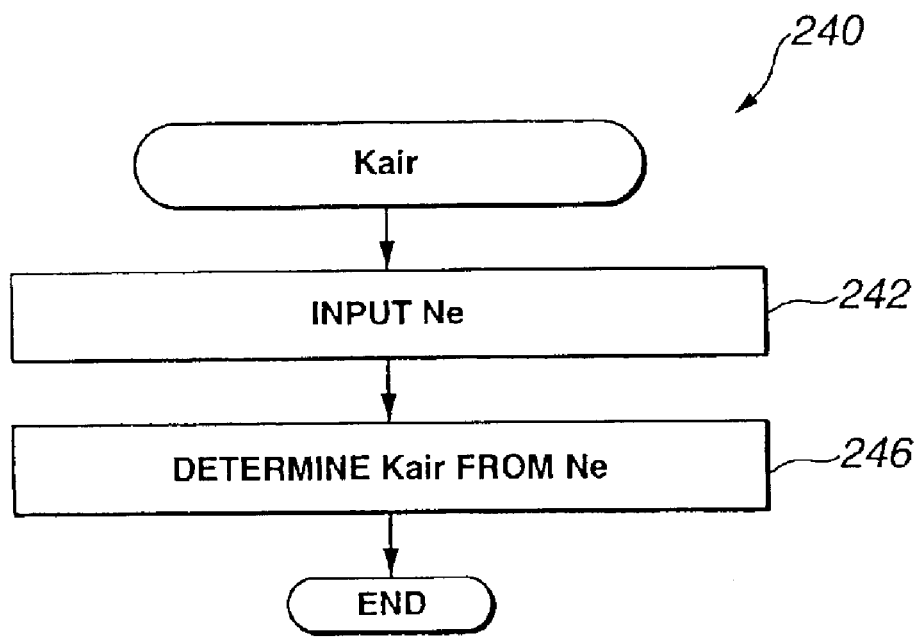
FIG. 11 is a flow diagram of a control routine illustrating control logic for determining a distribution ratio (Kair).

The flow diagram in FIG. 11 illustrates a control routine 240 of an exemplary embodiment of control logic for determining a distribution ratio Kair. The control routine 240 may be arranged as a sub-routine executed in box 222 of control routine 220 in FIG. 10.

Figure 12:
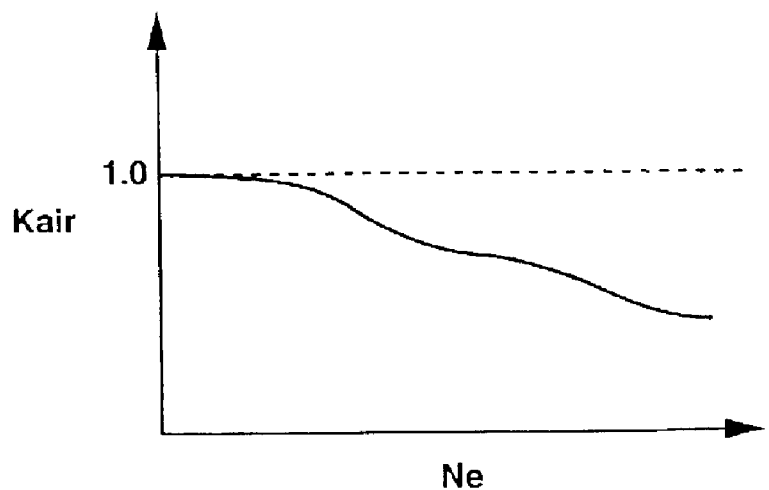
FIG. 12 illustrates a distribution ratio (Kair) look-up table indexed by engine speed (Ne).

In FIG. 11, at box 242, microprocessor 112 inputs information of engine speed Ne. In the next box 246, microprocessor 112 determines distribution ratio Kair from look-up table shown in FIG. 12, which table is indexed by engine speed Ne. It is appreciated from FIG. 12 that distribution ratio Kair decreases from 1 as engine speed increases beyond a certain vehicle speed value. In other words, engine speed Ne increases to vary distribution ratio Kair in such a direction as to decrease share of work to primary turbocharger 32 as engine speed increases beyond the certain vehicle speed value.

Figure 13:
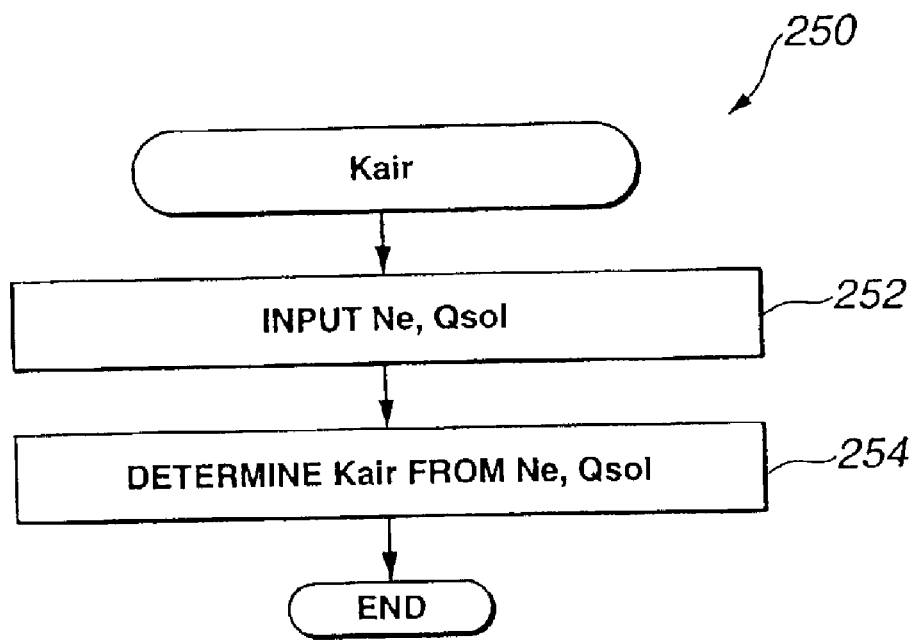
FIG. 13 is a flow diagram of a control routine illustrating another control logic for determining a distribution ratio (Kair).

The flow diagram in FIG. 13 illustrates a control routine 250 of another exemplary embodiment of control logic for determining a distribution ratio Kair. The control routine 250 may be arranged as a sub-routine executed in box 222 of control routine 220 in FIG. 10.

Figure 14:
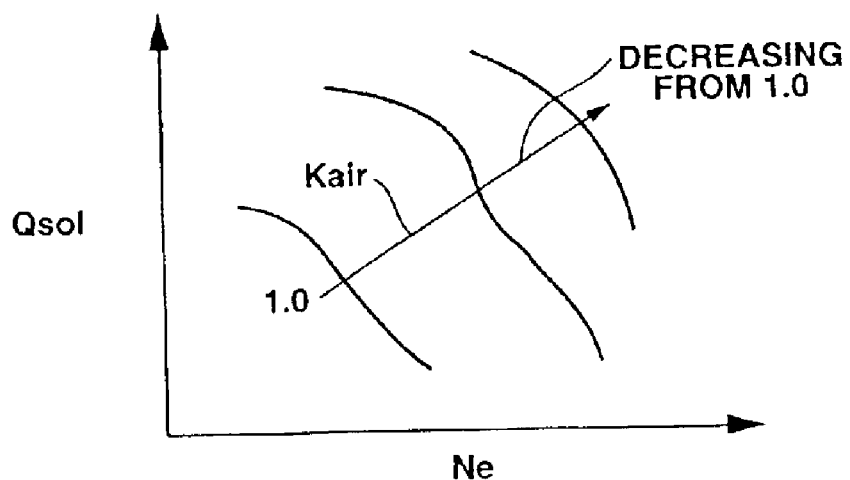
FIG. 14 illustrates another distribution ratio (Kair) look-up map indexed by engine speed (Ne) and desired fuel injection amount (Qsol).

In FIG. 13, at box 252, microprocessor 112 inputs information of: engine speed Ne, and desired fuel injection amount Qsol. In the next box 254, microprocessor 112 determines distribution ratio Kair from look-up map shown in FIG. 14, which map is indexed by engine speed Ne and desired fuel injection amount Qsol. Desired fuel injection amount Qsol represents engine load. It is appreciated from FIG. 14 that distribution ratio Kair decreases from 1 as engine speed increases with the same engine load or as engine load increases with the same engine speed. In other words, engine speed Ne and engine load Qsol shift toward operating conditions at high engine speeds with heavy engine load to vary distribution ratio Kair in such a direction as to decrease share of work to primary turbocharger 32 as engine speed Ne and engine load Qsol shift toward operating conditions at high engine speeds with heavy engine load.

Figure 15:
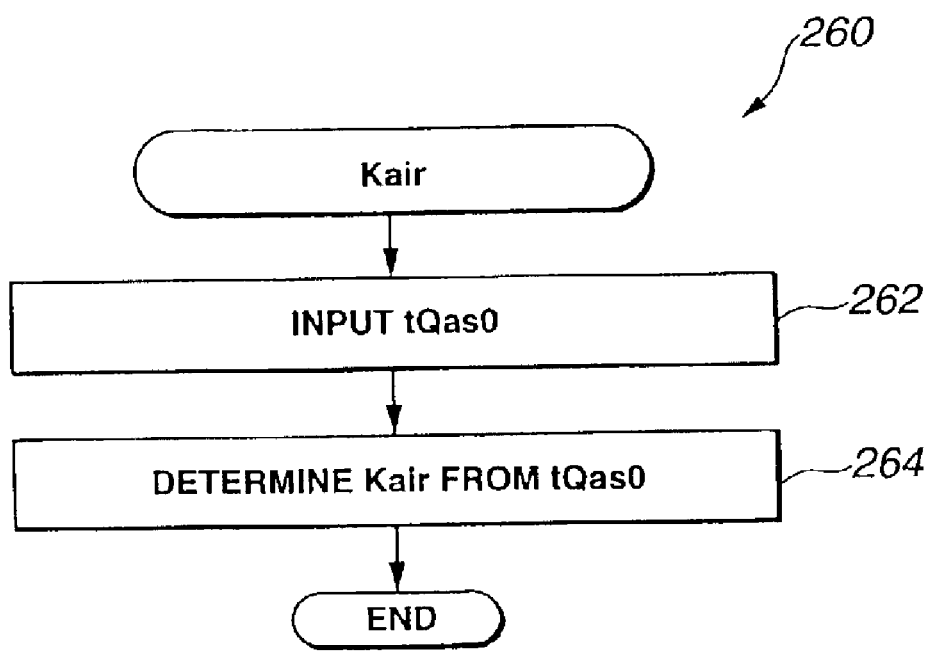
FIG. 15 is a flow diagram of a control routine illustrating another control logic for determining a distribution ratio (Kair).

The flow diagram in FIG. 15 illustrates a control routine 260 of another exemplary embodiment of control logic for determining a distribution ratio Kair. The control routine 260 may be arranged as a sub-routine executed in box 222 of control routine 220 in FIG. 10.

Figure 16:
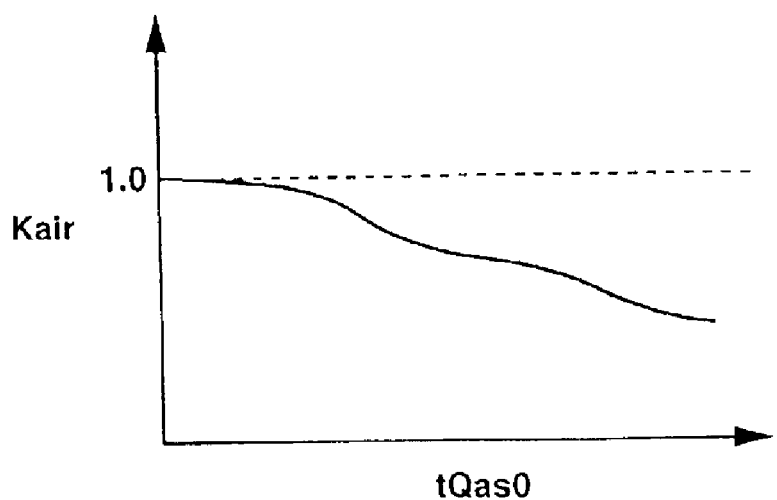
FIG. 16 illustrates another distribution ratio (Kair) look-up table indexed by intake air amount equivalence value (tQas0).

In FIG. 16, at box 262, microprocessor 112 inputs information of intake air amount equivalence value tQas0. In the next box 264, microprocessor 112 determines distribution ratio Kair from look-up table shown in FIG. 16, which table is indexed by intake air amount equivalence value tQas0. It is appreciated that intake air amount equivalence value tQas0 represents exhaust gas flow rate and thus may be regarded as exhaust gas flow rate equivalence value. The use of intake air amount equivalence value tQas0 is better in indexing various values of distribution ratio Kair than the use of desired fuel injection amount Qsol.

This section provides description on appropriate look-up maps for use in determining desired set points Rvnt1, Rvnt2 for primary and secondary turbochargers 32, 34 of multiple supercharger system 30A in vehicular system 10A illustrated in FIG. 9. In the case where turbochargers 32, 34 differ in specification and performance, appropriate look-up maps fit to the turbochargers are required. In the case where turbochargers 32, 34 are identical or may be regarded as identical, in specification and performance, a common look-up map may be used.

In the preceding description on FIGS. 10–16, system 10A including multiple supercharger system 30A is contemplated. If desired, control routine 220 may be applicable to system 10 equipped with multiple supercharger system 30 including two substantially identical turbochargers 32 and 34. In this case, distribution Kair is set equal to 0.5.

Figure 17:
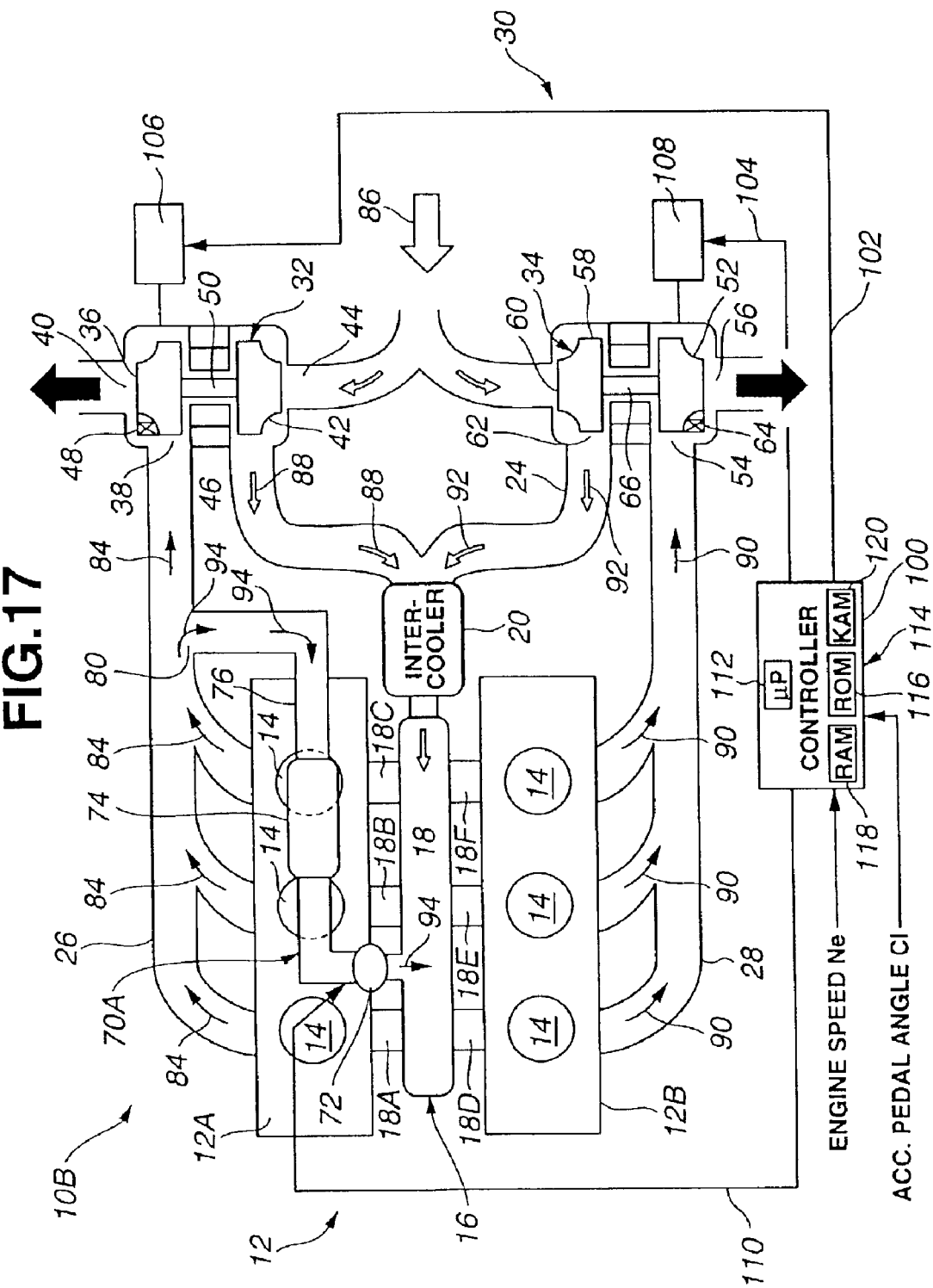
FIG. 17 is a schematic view of another system for controlling a vehicle having a compression ignition internal combustion engine equipped with an EGR system and a multiple supercharger system.

Referring to FIG. 17, there is shown a simplified view of another system for controlling a vehicle. The system, generally indicated by reference numeral 10B, is substantially the same as the previously described system 10. The same reference numerals are used in FIGS. 1 and 17 to indicate the same or similar parts or portions. However, system 10B is different from system 10 in the provision of an EGR system 70A in the place of EGR system 70. Unlike EGR system 70 which includes EGR duct 76 has inlets opening to first and second exhaust manifolds 26, 28, EGR system 70A includes an EGR duct 76 having an inlet opening to first exhaust manifold 26 only.

Figure 18:
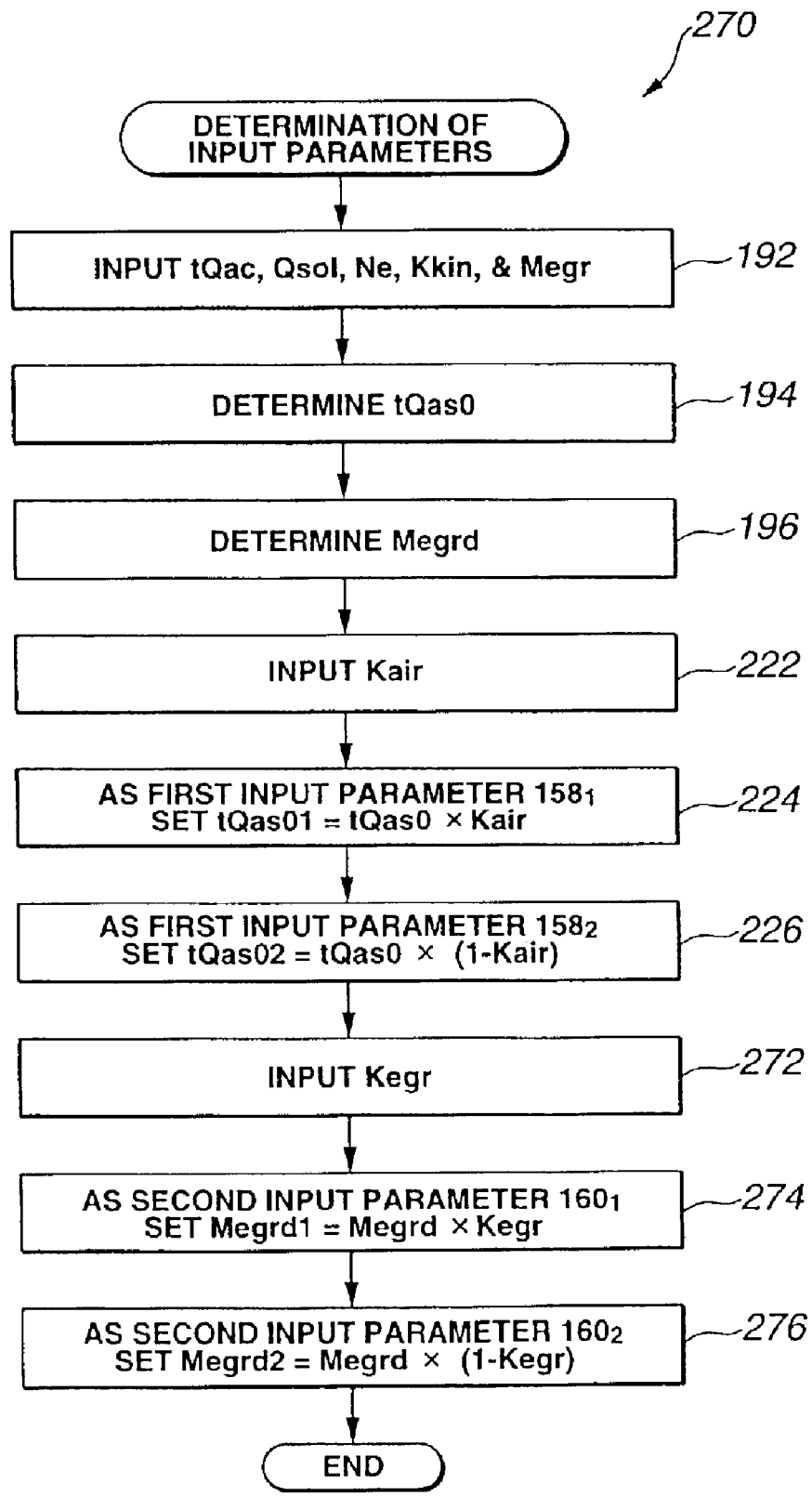
FIG. 18 is a flow diagram of a control routine illustrating control logic for determining first input parameters and control logic for determining second input parameters according to another embodiment of the present invention.

The flow diagram in FIG. 18 illustrates a control routine 270 of an exemplary embodiment of control logic 168 and control logic 178. Execution of control routine 270 is repeated at regular crank angle interval. Control routine 270 is substantially the same as control routine 220 (see FIG. 10) except the provision of boxes 272, 274, and 276 in the place of boxes 228 and 230. Application to system 10A in FIG. 9 is contemplated.

After processing in boxes 192, 194, 196, 222, 224, and 226, the control goes to box 272. In box 272, microprocessor 112 inputs a second distribution ratio Kegr that is variable from 1 toward 0 (zero). Second distribution ratio Kegr is determined in response to engine operating conditions. Determination of second distribution ratio Kegr may be made by executing a sub-routine in box 272. Alternatively, determination of second distribution ratio Kegr may be made by simply inputting the result of execution of an independent control routine for determining second distribution ratio Kegr in response to engine operating conditions.

In the next box 274, microprocessor 112 determines the first share Megrd1 of actual EGR rate Megrd using second distribution ratio Kegr. First share Megrd1 is expressed as $$Megrd1 = Megrd \times Kegr \qquad \text{Eq. 9}$$

In box 274, microprocessor 112 sets the first share Megr1 as second input parameter $160_1$.

In box 276, microprocessor 112 determines the second or remaining share Megrd2 of actual EGR rate Megrd using a term (1−Kegr). Second share Megrd2 is expressed as $$Megrd2 = Megrd \times (1 - Kegr) \qquad \text{Eq. 10}$$

In box 276, microprocessor 112 sets the second share Megrd2 as second input parameter $160_2$.

With reference to FIG. 2B, in control logic 154, using the first and second input parameters $158_1$ (=tQas01), $160_1$ (=Megrd1), microprocessor 112 determines a desired ratio of nozzle opening as first desired set point Rvnt1 from look-up map prepared for primary turbocharger 32. In control logic 156, using the first and second input parameters $158_2$ (=tQas02), $160_2$ (=Megrd2), microprocessor 112 determines a desired ratio of nozzle opening as second desired set point Rvnt2 from look-up map prepared for secondary turbocharger 34.

Figure 19:
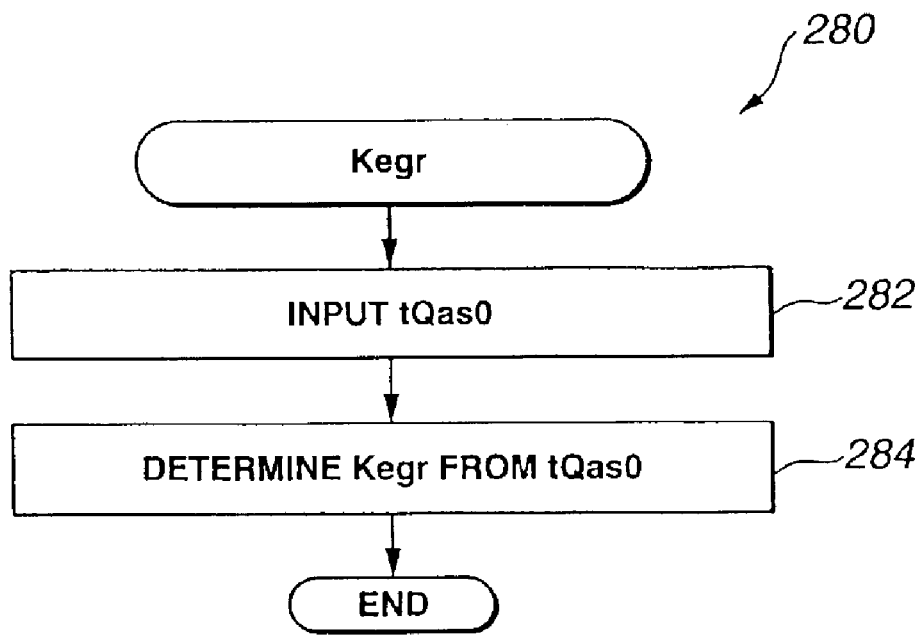
FIG. 19 is a flow diagram of a control routine illustrating control logic for determining other distribution ratio (Kegr).

The flow diagram in FIG. 19 illustrates a control routine 280 of an exemplary embodiment of control logic for determining a second distribution ratio Kegr. The control routine 280 may be arranged as a sub-routine executed in box 272 of control routine 270 in FIG. 18.

Figure 20:
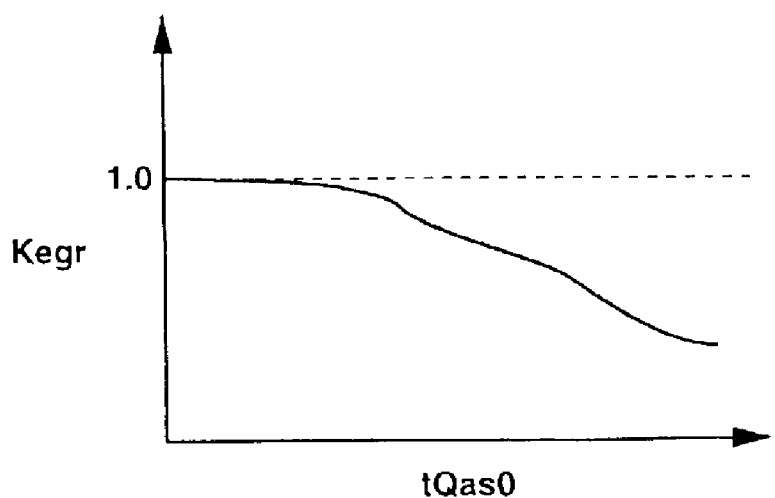
FIG. 20 illustrates other distribution ratio (Kegr) look-up table indexed by intake air amount equivalence value (tQas0).

In FIG. 19, at box 282, microprocessor 112 inputs information of intake air amount equivalence value tQas0. In the next box 284, microprocessor 112 determines second distribution ratio Kegr from look-up table shown in FIG. 20, which table is indexed by intake air amount equivalence value tQas0. It is appreciated from FIG. 20 that second distribution ratio Kegr decreases from 1 as intake air amount equivalence value tQas0 increases beyond a certain value.

Figure 21:
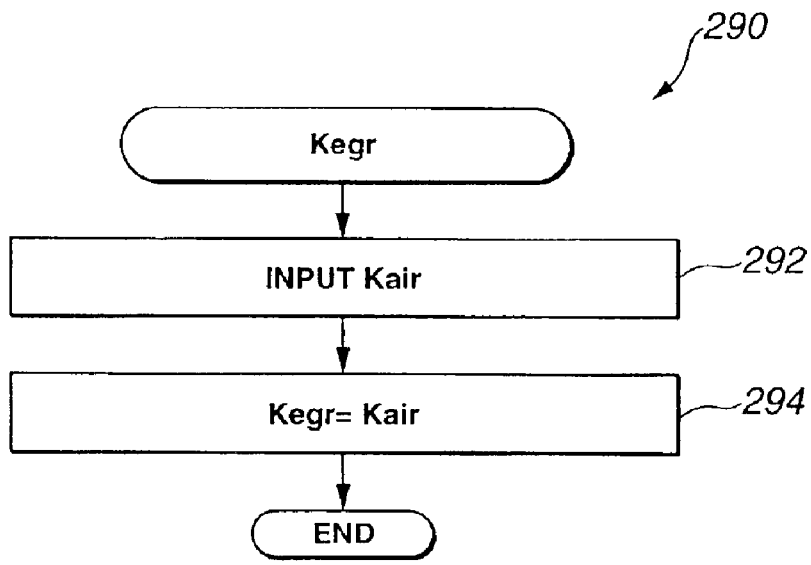
FIG. 21 is a flow diagram of a control routine illustrating control logic for determining other distribution ratio (Kegr).

The flow diagram in FIG. 21 illustrates a control routine 290 of an exemplary embodiment of control logic for determining a second distribution ratio Kegr. The control routine 290 may be arranged as a sub-routine executed in box 272 of control routine 270 in FIG. 18.

In FIG. 21, at box 292, microprocessor 112 inputs information of distribution ratio Kair. In the next box 294, microprocessor 112 sets the distribution ratio Kair as second distribution ratio Kegr. The control routine 290 is applicable to system 10A equipped with multiple supercharger system 30A (see FIG. 9) including two identical turbochargers 32, 34. In the case where the turbochargers 32, 34 are not identical, the control routine 290 is applicable if there is the proportionality between intake air flow rate and the influence upon RGR valve inlet pressure.

Control routine 270 in FIG. 18 is applicable to system 10B in FIG. 17. In system 10B, EGR system 70A has influence on operation of turbocharger 32 only. Turbocharger 34 is left unaffected by EGR. In this case, second distribution ratio Kegr is set equal to 1 (Kegr=1).

Figure 22:
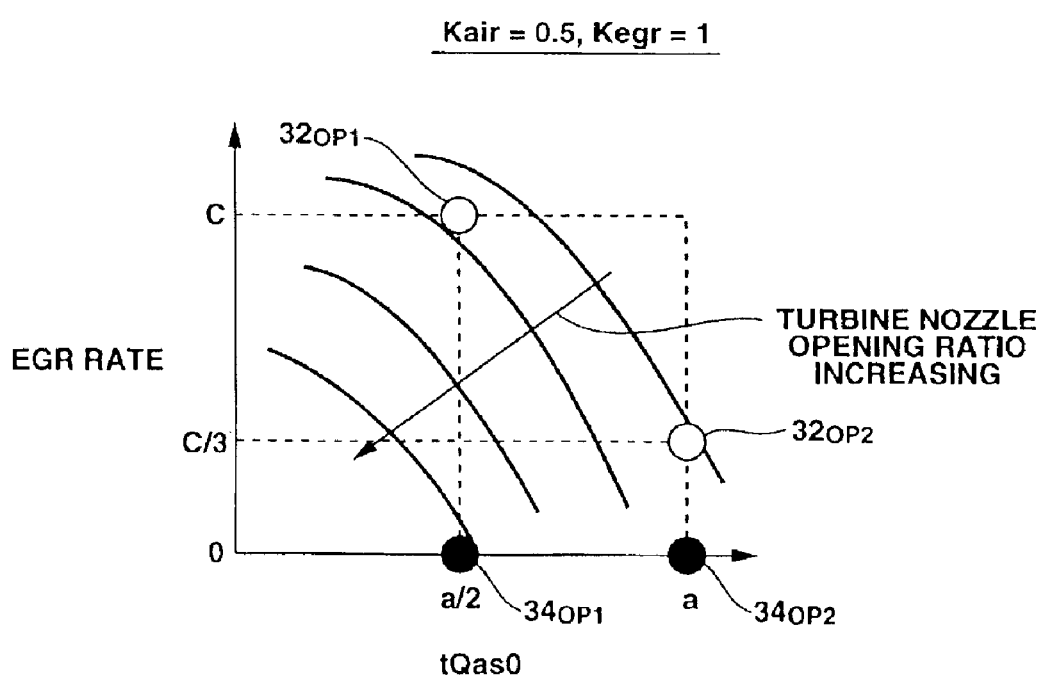
FIG. 22 is a desired set point map illustrating varying of desired set points of turbochargers with two different engine operating conditions.

Referring to FIG. 22, control routine 270 (FIG. 18) as applied to system 10B in FIG. 17 is further described. It is now assumed that turbochargers 32 and 34 are identical in specification and performance. Thus, the setting is such that Kair=0.5 and Kegr=1. It is also assumed that the specification and performance of each turbocharger are great enough to meet air supply demand by all of combustion cylinders 14. Two operating conditions are considered. First operating condition: tQas0=a, and Megrd (=EGR rate)=C. Second operating condition: tQas0=2a, and Megrd (=EGR rate)=C/3.

Under the first operating condition, desired set points for turbochargers 32 and 34 are illustrated at point $32_{OP1}$ (a/2, C) and at point $34_{OP1}$(a/2, 0). Under the second operating condition, desired set points for turbochargers 32 and 34 are illustrated at point $32_{OP2}$(a, C/3) and at point $34_{OP2}$(a, 0). It will be appreciated excessive reduction in turbine nozzle ratio is suppressed against a great increase in intake air demand and a considerable reduction in EGR rate.

In the preceding description, the actual EGR rate Megrd is used. Alternatively, an EGR amount equivalence value Qes0 may be used instead of Megrd. EGR amount equivalence value Qes0 is described in paragraph [0178] of the incorporated U.S. Patent Application Publication Pub. No.: US2001/0045210 A1.

It is appreciated from the preceding description that engine-operating conditions determine second distribution ratio Kegr. The engine-operating conditions in determining Kegr include a contribution parameter indicative of contribution of the primary and secondary turbochargers to inlet pressure of EGR system. Examples of the contribution parameter include at least one of engine speed and engine load, an exhaust gas flow rate equivalence value represented by intake air amount equivalence value tQas0.

In the preceding description, each of desired set points is indicative of a ratio of opening position of the turbine nozzles to the fully opened position thereof. Alternatively, each of desired set points is indicative of opening position of the waste gate of each turbine of a fixed geometry turbocharger.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2001-316291, filed Oct. 15, 2001, the disclosure of which is hereby incorporated by reference in its entirety.

What is claimed is:

1. A system for controlling a vehicle having a compression ignition internal combustion engine, the compression ignition engine having a plurality of combustion cylinders, an intake manifold, an exhaust gas recirculation (EGR) system and a supercharger system including a plurality of superchargers, the system comprising:

control logic for determining a desired intake manifold supercharging state;

control logic for determining a desired EGR rate;

control logics, each having a first input parameter and a second input parameter, for determining desired set points for the plurality of superchargers, respectively, the desired set points being used to control the plurality of superchargers, respectively;

control logic for determining the first input parameters in response to the desired intake manifold supercharging state; and control logic for determining the second input parameters in response to the desired EGR rate.

2. The system as claimed in claim 1, wherein the control logic for determining the first input parameters includes:

control logic for determining an intake air amount equivalence value as a function of the desired intake manifold supercharging state;

wherein the control logic for determining the second input parameters includes:

control logic for determining an actual EGR rate as a function of the desired EGR rate.

3. The system as claimed in claim 1, wherein the control logic for determining the first input parameters includes:

control logic for determining proportion of each to the total of the first input parameters.

4. The system as claimed in claim 3, wherein the control logic for determining the second input parameters includes:

control logic for determining proportion of each to the total of the second input parameters.

5. The system as claimed in claim 3, wherein the supercharger system includes a primary turbocharger and a secondary turbocharger, which operate sequentially.

6. The system as claimed in claim 4, wherein the supercharger system includes a primary turbocharger and a secondary turbocharger, which operate sequentially.

7. The system as claimed in claim 5, wherein the control logic for determining proportion of each to the total of the first input parameters includes:
control logic for determining a distribution ratio in response to the engine operating conditions.

8. The system as claimed in claim 6, wherein the control logic for determining proportion of each to the total of the first input parameters includes:
control logic for determining a distribution ratio in response to the engine operating conditions.

9. The system as claimed in claim 7, wherein the engine operating conditions include the engine speed, and wherein the engine speed increases to vary the distribution ratio in such a direction as to decrease the share of work to the primary turbocharger as the engine speed increases, the primary turbocharger being adapted to do almost all work at low engine speeds.

10. The system as claimed in claim 8, wherein the engine operating conditions include the engine speed, and wherein the engine speed increases to vary the distribution ratio in such a direction as to decrease the share of work to the primary turbocharger is decreased as the engine speed increases, the primary turbocharger being adapted to do almost all work at low engine speeds.

11. The system as claimed in claim 7, wherein the engine operating conditions include the engine speed and the engine load, and wherein the engine speed and load shift toward operating conditions at high engine speeds with heavy engine load to vary the distribution ratio in such a direction as to decrease the share of work to the primary turbocharger as the engine speed and load shift toward operating conditions at high engine speeds with heavy engine load, the primary turbocharger being adapted to do almost all work at low engine speeds.

12. The system as claimed in claim 8, wherein the engine operating conditions include the engine speed and the engine load, and wherein the engine speed and load shift toward operating conditions at high engine speeds with heavy engine load to vary the distribution ratio in such a direction as to decrease the share of work to the primary turbocharger as the engine speed and load shift toward operating conditions at high engine speeds with heavy engine load, the primary turbocharger being adapted to do almost all work at low engine speeds.

13. The system as claimed in claim 7, wherein the engine operating conditions include an exhaust gas flow rate equivalence value that is determined as a function of an intake air amount, a desired fuel injection amount, and the engine speed.

14. The system as claimed in claim 8, wherein the engine operating conditions include an exhaust gas flow rate equivalence value that is determined as a function of an intake air amount, a desired fuel injection amount, and the engine speed.

15. The system as claimed in claim 4,
wherein the supercharger system includes a primary turbocharger and a secondary turbocharger which work sequentially;
wherein the control logic for determining proportion of each to the total of the first input parameters includes:
control logic for determining a first distribution ratio in response to the engine operating conditions;
and wherein the control logic for determining proportion of each to the total of the second input parameters includes:
control logic for determining a second distribution ratio in response to the engine operating conditions.

16. The system as claimed in claim 15, wherein the engine operating conditions, which are used in determining the second distribution ratio, include the engine speed.

17. The system as claimed in claim 15, wherein the engine operating conditions used in determining the second distribution ratio include the engine speed and the engine load.

18. The system as claimed in claim 15, wherein the EGR system has an inlet and an outlet, and wherein the engine operating conditions used in determining the second distribution ratio include a contribution parameter indicative of contribution of the primary and secondary turbochargers to pressure at the inlet of the EGR system.

19. The system as claimed in claim 18, wherein the contribution parameter is one of the engine speed and the engine load.

20. The system as claimed in claim 18, wherein the contribution parameter is an exhaust gas flow rate equivalence value that is determined as a function of an intake air amount, a desired fuel injection amount, and the engine speed.

21. The system as claimed in claim 4,
wherein the supercharger system includes a primary turbocharger and a secondary turbocharger which work sequentially;
and wherein the second distribution ratio is equal to the first distribution ratio.

22. The system as claimed in claim 3, wherein the supercharger system includes a first turbocharger that is capable of providing sufficient supply of intake air required by one half of the plurality of combustion cylinders, and a second turbocharger that is capable of providing sufficient supply of intake air required by the other half of the plurality of combustion cylinders; and wherein the first and second turbochargers work simultaneously.

23. The system as claimed in claim 22, wherein the distribution ratio is set such that the proportions of the first input parameters are equal to each other.

24. The system as claimed in claim 4,
wherein the supercharger system includes a first variable geometry turbocharger that is capable of providing sufficient supply of intake air required by one half of the plurality of combustion cylinders, and a second variable geometry turbocharger that is capable of providing sufficient supply of intake air required by the other half of the plurality of combustion cylinders; and wherein the first and second turbochargers work simultaneously;
wherein the engine has a first exhaust manifold and a second exhaust manifold coupled to the one half and the other half of the plurality of combustion cylinders, respectively; wherein the EGR system includes an EGR duct connecting the first exhaust manifold to the intake manifold;
wherein the first variable geometry turbocharger includes a turbine having an inlet coupled to the first exhaust manifold and an outlet; wherein the second variable geometry turbocharger includes a turbine having an inlet coupled to the second exhaust manifold and an outlet;
wherein the first distribution ratio is set such that the proportions of the first input parameters are equal to each other;

and wherein the second distribution ratio is set such that the proportions of the second input parameters of the control logics for determining desired set points for the first and second various geometry turbochargers are 1 and zero, respectively.

25. The system as claimed in claim 24, wherein the desired set points for the first and second variable geometry turbochargers are set such that work performed by the first variable geometry turbocharger is equal to work performed by the second variable geometry turbocharger.

26. The system as claimed in claim 1, wherein the supercharger system includes a plurality of variable geometry turbochargers, each variable geometry turbocharger having a turbine including turbine nozzles; and wherein each of the desired set points is indicative of a ratio of opening position of the turbine nozzles of each of the turbines to the fully opened position thereof.

27. The system as claimed in claim 1, wherein the supercharger system includes a plurality of fixed geometry turbochargers, each fixed geometry turbocharger having a turbine including a waste gate; and wherein each of the desired set points is indicative of opening position of the waste gate of each of the turbines.

28. A method of controlling a vehicle having a compression ignition internal combustion engine, the compression ignition engine having a plurality of combustion cylinders, an intake manifold, a first exhaust manifold and a second exhaust manifold, each coupled with a plurality of the combustion cylinders, an exhaust gas recirculation (EGRI system including an EGR duct connecting the first and second exhaust manifolds to the intake manifold, and a supercharger system including a first variable geometry turbocharger (VGT) and a second VGT, the first VGT including a first turbine having an inlet fluidly coupled with the first exhaust manifold and an outlet, and a first compressor having an inlet and an outlet, the second VGT including a second turbine having an inlet fluidly coupled with the second exhaust manifold and an outlet, and a second compressor having an inlet and an outlet, the method comprising:
  determining a desired intake air amount as a desired intake manifold supercharging state;
  determining a desired EGR rate;
  determining a first desired set point for the first VGT in response to a first input parameter and a second input parameter, the first desired set point being used to control the first VGT so as to track the first desired set point;
  determining a second desired set point for the second VGT in response to a first input parameter and a second input parameter, the second desired set point being used to control the second VGT so as to track the second desired set point;
  determining the first input parameters in response to the desired intake manifold supercharging state; and
  determining the second input parameters in response to the desired EGR rate.

29. The method as claimed in claim 28,
wherein the determining the first input parameters includes:
  determining an intake air amount equivalence value as a function of the desired intake manifold supercharging state;
and wherein the determining the second input parameters includes:
  determining an actual EGR rate as a function of the desired EGR rate.

30. The method as claimed in claim 29,
wherein the determining the first input parameters includes:
  determining proportion of each to the total of the first input parameters.

31. The method as claimed in claim 30,
wherein the determining the second input parameters includes:
  determining proportion of each to the total of the second input parameters.

32. The method as claimed in claim 30,
wherein the determining the first input parameters further includes:
  varying the proportion of each of the first input parameters to the total thereof in response to at least one of the engine speed and load.

33. The method as claimed in claim 32,
wherein the determining the second input parameters further includes:
  varying the proportion of each of the second input parameters to the total thereof in response to at least one of the engine speed and load.

34. The method as claimed in claim 30,
wherein the determining the first input parameters includes:
  multiplying the intake air amount equivalence value with a distribution ratio to give one of the first input parameters; and
  subtracting the one of the first input parameters from the intake air amount equivalence value to give the other of the first input parameters.

35. The method as claimed in claim 34,
wherein the determining the second input parameters includes:
  multiplying the actual EGR rate with a second distribution ratio to give one of the second input parameters; and
  subtracting the one of second input parameters from the actual EGR rate to give the other of the second input parameters.

36. The method as claimed in claim 34, wherein the determining the first input parameters includes:
  varying the distribution ratio in response to at least one of the engine speed and load.

37. The method as claimed in claim 29, further comprising:
  determining a base fuel injection amount based on a current value of the engine speed and a current value of an accelerator pedal opening angle; and
  determining a desired fuel injection amount by correcting the base fuel injection amount with a current value of the engine coolant temperature.

38. The method as claimed in claim 37, wherein the determining a desired EGR rate includes:
  determining a base desired EGR rate based on a current value of the desired fuel injection amount and a current value of the engine speed; and
  correcting the base desired EGR rate with a coolant temperature coefficient that is determined in response to a current value of the engine coolant temperature to determine the desired EGR rate.

39. The method as claimed in claim 38, further comprising:
  determining a base volumetric efficiency equivalence value based on a current value of the desired fuel injection amount and a current value of the engine speed.

40. The method as claimed in claim 39, wherein the determining an actual EGR rate is governed by the following equation:

$$Megrd = Megr \times Kkin \times Ne \times KE2\# + Megrd_{n-1} \times (1 - Kkin \times Ne \times KE2\#)$$

where

Megrd represents an actual EGR rate at an inlet valve of combustion cylinder, $Megrd_{n-1}$ represents a preceding value of the Megrd obtained a predetermined time interval ago, Megr represents a current value of the desired EGR rate, $$Kkin = Kin \times KVOL\#$$

$$Kin = Kinb \times \frac{1}{1 + \frac{Megrd_{n-1}}{100}}$$

$$KVOL\# = \frac{VE}{NC \times VM}$$

VE represents the displacement of compression ignition internal combustion engine, NC represents the number of combustion cylinders, VM represents the capacity of the engine induction system, Ne represents the engine speed, and KE2# represents a constant.

41. The method as claimed in claim 40, wherein the determining a desired intake air amount (tQac) is governed by the following equation:

$$tQac = Mqdrv \times \frac{BLAMB\#}{Tfbya}$$

where $$Tfbya = \frac{Tlamb + Megrd \times (Tlamb - 1)}{Tlamb^2}$$

where

Mqdrv represents the base fuel injection amount,

Tfbya represents a desired equivalence ratio,

BLAMB#=14.7,

Tlamb represents a desired excess air ratio.

42. The method as claimed in claim 41, wherein the determining an intake air amount equivalence value (tQas0) is governed by the following equation:

$$tQas0 = \frac{(tQac + Qsol \times QFGAN\#) \times Ne}{KCON\#}$$

where tQac represents a desired intake air amount,

Qsol represents a desired fuel injection amount,

QFGAN# represents a gain,

Ne represents the engine speed,

KCON# represents a constant.

43. A computer readable storage medium having information stored thereon representing instructions to control a vehicle having a compression ignition internal combustion engine, the compression ignition internal combustion engine having an intake manifold, an exhaust gas recirculation (EGR) system, and a supercharger system including a first variable geometry turbocharger (VGT) and a second VGT, the computer readable storage medium comprising:

instructions for determining a desired intake air amount as a desired intake manifold supercharging state;

instructions for determining a desired EGR rate;

instructions for determining a first desired set point for the first VGT in response to a first input parameter and a second input parameter, the first desired set point being used to control the first VGT so as to track the first desired set point;

instructions for determining a second desired set point for the second VGT in response to a first input parameter and a second input parameter, the second desired set point being used to control the second VGT so as to track the second desired set point;

instructions for determining the first input parameters in response to the desired intake manifold supercharging state; and instructions for determining the second input parameters in response to the desired EGR rate.

44. The computer readable storage medium as claimed in claim 43, wherein the instructions for determining the first input parameters includes:

instructions for determining an intake air amount equivalence value as a function of the desired intake manifold supercharging state;

and wherein the instructions for determining the second input parameters include:

instructions for determining an actual EGR rate as a function of the desired EGR rate.

45. The computer readable storage medium as claimed in claim 43, wherein the instructions for determining the first input parameters includes:

instructions for determining proportion of each to the total of the first input parameters.

46. The computer readable storage medium as claimed in claim 45, wherein the instructions for determining the second input parameters includes:

instructions for determining proportion of each to the total of the second input parameters.

47. A compression ignition internal combustion engine, comprising:

a plurality of combustion cylinders;

an intake manifold coupled with the plurality of combustion cylinders;

a first exhaust manifold and a second exhaust manifold, each of the first and second exhaust manifolds being coupled with a plurality of the combustion cylinders;

an exhaust gas recirculation (EGR) system including an EGR duct fluidly interconnecting each of the first and second exhaust manifolds and at least one of the first and second intake manifolds;

a first variable geometry turbocharger including a first turbine having an inlet and an outlet, and a first compressor having an inlet and an outlet, the first turbine inlet being fluidly coupled with the first exhaust manifold, the first compressor outlet being fluidly coupled with the intake manifold, the first turbocharger including a controllable first actuator for varying the first turbocharger geometry;

a second variable geometry turbocharger including a second turbine having an inlet and an outlet, and a second compressor having an inlet and an outlet, the second turbine inlet being fluidly coupled with the second exhaust manifold, the second compressor outlet being fluidly coupled with the intake manifold, the second turbocharger including a controllable second actuator for varying the second turbocharger geometry;

control logic for determining a desired intake manifold supercharging state;

control logic for determining a desired EGR rate;

control logic, having a first input parameter and a second input parameter, for determining a first desired set point (Rvnt1) for the first variable geometry turbocharger;

control logic, having a first input parameter and a second input parameter, for determining a second desired set point for the second variable geometry turbocharger;

control logic for determining the first input parameters in response to the desired intake manifold supercharging state;

control logic for determining the second input parameters in response to the desired EGR rate;

control logic for controlling the first actuator to change the current first turbocharger geometry so as to track the first desired set point; and control logic for controlling the second actuator to change current second turbocharger geometry so as to track the second desired set point.

48. The compression ignition internal combustion engine as claimed in claim 47, wherein the control logic for determining the first input parameters includes:

control logic for determining an intake air amount equivalence value as a function of the desired intake manifold supercharging state;

and wherein the control logic for determining the second input parameters includes:

control logic for determining an actual EGR rate as a function of the desired EGR rate.

49. The compression ignition internal combustion engine as claimed in claim 48, wherein the control logic for determining the first input parameters includes:

control logic for multiplying the intake air amount equivalence value with a distribution ratio to give one of the first input parameters; and control logic for subtracting the one of the first input parameters from the intake air amount equivalence value to give the other of the first input parameters.

50. The compression ignition internal combustion engine as claimed in claim 49, wherein the control logic for determining the first input parameters includes:

control logic for varying the distribution ratio in response to at least one of engine speed, engine load, and an intake air amount equivalence value.

51. A compression ignition internal combustion engine, comprising:

a plurality of combustion cylinders;

an intake manifold coupled with the plurality of combustion cylinders;

a first exhaust manifold and a second exhaust manifold, each of the first and second exhaust manifolds being coupled with a plurality of the combustion cylinders;

an exhaust gas recirculation (EGR) system including an EGR duct fluidly interconnecting the first exhaust manifold and the intake manifold;

a first variable geometry turbocharger including a first turbine having an inlet and an outlet, and a first compressor having an inlet and an outlet, the first turbine inlet being fluidly coupled with the first exhaust manifold, the first compressor outlet being fluidly coupled with the intake manifold, the first turbocharger including a controllable first actuator for varying the first turbocharger geometry;

a second variable geometry turbocharger including a second turbine having an inlet and an outlet, and a second compressor having an inlet and an outlet, the second turbine inlet being fluidly coupled with the second exhaust manifold, the second compressor outlet being fluidly coupled with the intake manifold, the second turbocharger including a controllable second actuator for varying the second turbocharger geometry;

control logic for determining a desired intake manifold supercharging state;

control logic for determining a desired EGR rate;

control logic, having a first input parameter and a second input parameter, for determining a first desired set point for the first variable geometry turbocharger;

control logic, having a first input parameter, for determining a second desired set point for the second variable geometry turbocharger;

control logic for determining the first input parameters in response to the desired intake manifold supercharging state;

control logic for determining the second input parameter in response to the desired EGR rate;

control logic for controlling the first actuator to change the current first turbocharger geometry so as to track the first desired set point; and control logic for controlling the second actuator to change the current second turbocharger geometry so as to track the second desired set point.

52. A system for controlling a vehicle having a compression ignition internal combustion engine, the compression ignition internal combustion engine having a plurality of combustion cylinders, an intake manifold, an exhaust gas recirculation (EGR) system, and a supercharger system including a plurality of superchargers, the system comprising:

means for determining a desired intake manifold supercharging state;

means for determining a desired EGR rate;

a plurality of means, each having a first input parameter and a second input parameter, for determining desired set points for the plurality of superchargers, respectively, the desired set points being used to control the plurality of superchargers, respectively;

means for determining the first input parameters in response to the desired intake manifold supercharging state; and means for determining the second input parameters in response to the desired EGR rate.

* * * * *